US008422743B2

(12) United States Patent
Shimizu et al.

(10) Patent No.: US 8,422,743 B2
(45) Date of Patent: Apr. 16, 2013

(54) SURFACE-READING APPARATUS, SUBJECT VERIFICATION APPARATUS AND STORAGE MEDIUM STORING SUBJECT VERIFICATION PROGRAM

(75) Inventors: Tadashi Shimizu, Kanagawa (JP); Tetsuya Kimura, Kanagawa (JP); Kensuke Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1140 days.

(21) Appl. No.: 11/798,746

(22) Filed: May 16, 2007

(65) Prior Publication Data

US 2008/0151324 A1 Jun. 26, 2008

(30) Foreign Application Priority Data

Dec. 21, 2006 (JP) ................................ 2006-344675

(51) Int. Cl.
*G06K 9/00* (2006.01)
*G06K 9/20* (2006.01)
*B44F 1/12* (2006.01)
*D21F 9/00* (2006.01)

(52) U.S. Cl.
USPC ........... 382/108; 382/111; 382/112; 382/141; 382/181; 162/140; 162/196; 162/197; 162/198; 162/263; 162/270; 162/171; 162/295

(58) Field of Classification Search .................. 382/108, 382/111, 112, 141, 181; 162/140, 196, 197, 162/194, 263, 270, 271, 295; 250/559.01, 250/559.07, 559.08
See application file for complete search history.

(56) References Cited

U.S. PATENT DOCUMENTS 3,752,487 A * 8/1973 de La Celle ..................... 360/90
3,881,186 A * 4/1975 Nakauchi et al. ............... 360/90
3,996,842 A * 12/1976 Ehlich et al. ...................... 493/8
4,213,056 A * 7/1980 Matsumura et al. ..... 250/559.01

(Continued)

FOREIGN PATENT DOCUMENTS

CN 1326893 A 12/2001
CN 1469321 A 1/2004

(Continued)

OTHER PUBLICATIONS

"Bending of Wood—Civil Engineering Materials Laboratory, CE 305L." Materials Response Laboratory. University of New Mexico Civil Engineering Department, May 4, 2004. Web. Dec. 30, 2011. <http://civilx.unm.edu/laboratories_ss/mechmat/bendwood.html>.*

(Continued)

*Primary Examiner* — Michael A Newman
(74) *Attorney, Agent, or Firm* — Oliff & Berridge, PLC

(57) ABSTRACT

The present invention provides a surface-reading apparatus that includes a subject-flexing mechanism and a surface-reading component. The subject-flexing mechanism causes a subject to flex in one of a convex form and a concave form. The surface-reading component reads a characteristic of a surface condition of the subject that has been flexed by the subject-flexing mechanism. The surface-reading component can includes an optical reading component that optically reads the characteristic of the surface condition of the subject. The optical reading component may be a reflected light-reading component that reads the characteristic of the surface condition of the subject with reflected light or may be a transmitted light-reading component that reads the characteristic of the surface condition of the subject with transmitted light.

6 Claims, 21 Drawing Sheets

U.S. PATENT DOCUMENTS

| | | | | |
|---|---|---|---|---|
| 4,513,335 | A * | 4/1985 | van Kreuningen | 360/94 |
| 5,168,322 | A * | 12/1992 | Clarke et al. | 356/237.2 |
| 5,265,082 | A * | 11/1993 | Gniewek et al. | 369/53.45 |
| 5,344,192 | A * | 9/1994 | Phillips | 283/91 |
| 5,690,417 | A * | 11/1997 | Polidor et al. | 362/244 |
| 5,871,615 | A * | 2/1999 | Harris | 162/140 |
| 5,923,494 | A * | 7/1999 | Arisaka et al. | 360/78.02 |
| 5,958,137 | A * | 9/1999 | Caldwell et al. | 118/663 |
| 6,394,346 | B1 * | 5/2002 | Bonneau et al. | 235/438 |
| 6,950,547 | B2 * | 9/2005 | Floeder et al. | 382/143 |
| 6,973,198 | B2 * | 12/2005 | Patton et al. | 382/100 |
| 7,212,319 | B2 * | 5/2007 | Mercer | 358/474 |
| 7,486,464 | B2 * | 2/2009 | Saliba | 360/71 |
| 2002/0020960 | A1 | 2/2002 | Waragai et al. | |
| 2004/0005157 | A1 | 1/2004 | Akita | |
| 2004/0079800 | A1 * | 4/2004 | Sugino et al. | 235/436 |
| 2004/0184639 | A1 * | 9/2004 | Jackson et al. | 382/111 |
| 2004/0238318 | A1 | 12/2004 | Ito et al. | |
| 2004/0262836 | A1 * | 12/2004 | Tamamoto | 271/264 |
| 2005/0047593 | A1 * | 3/2005 | Hampp | 380/54 |
| 2006/0029251 | A1 * | 2/2006 | Maeda et al. | 382/100 |
| 2007/0091499 | A1 * | 4/2007 | Saliba | 360/71 |
| 2009/0096156 | A1 * | 4/2009 | Hendle et al. | 271/234 |

FOREIGN PATENT DOCUMENTS

| | | | |
|---|---|---|---|
| JP | A-61-189766 | | 8/1986 |
| JP | A-4-225678 | | 8/1992 |
| JP | A-7-159335 | | 6/1995 |
| JP | A-8-54351 | | 2/1996 |
| JP | A 8-120598 | | 5/1996 |
| JP | A-2003-091763 | | 3/2003 |
| JP | A-2004-038879 | | 2/2004 |
| JP | A-2004-102562 | | 4/2004 |
| JP | A-2005-018177 | | 1/2005 |
| JP | A-2005-067008 | | 3/2005 |
| JP | A-2005-175861 | | 6/2005 |
| JP | A-2005-215967 | | 8/2005 |
| JP | 2006250551 | | 9/2006 |
| JP | 2006250551 | A * | 9/2006 |
| KR | 10-2004-0044754 | | 5/2004 |

OTHER PUBLICATIONS

Chinese Office Action issued in Application No. 200710109129.6; Issued on Dec. 11, 2009 (With Translation).

Office Action mailed on Oct. 4, 2011 in Japanese Application No. 2006-344675. (with English language translation).

May 10, 2011 Office Action issued in Japanese Patent Application No. 2006-344675 (with English-language translation).

Office Action from the Japanese Patent Office dated Feb. 10, 2012 for corresponding Japanese Patent Application No. 2006-344675.

* cited by examiner

PLAN VIEW (RADIUS OF CURVATURE=∞), 32×32 PIXELS

RADIUS OF CURVATURE=25mm, 32×32 PIXELS

SURFACE-READING APPARATUS, SUBJECT VERIFICATION APPARATUS AND STORAGE MEDIUM STORING SUBJECT VERIFICATION PROGRAM

CROSS-REFERENCE TO RELATED APPLICATION

This application is based on and claims priority under 35 USC 119 from Japanese Patent Application No. 2006-344675, filed Dec. 21, 2006.

BACKGROUND

1. Technical Field

The present invention relates to a surface-reading apparatus, a subject verification apparatus and a storage medium at which a subject verification program is stored.

2. Related Art

There are cases in which the surface of a subject is read and a characteristic of a surface condition of the subject that has been read is utilized in carrying out, for example, inspection or the like of an article. In recent years, surface matching technology has attracted attention as a technology which can enable assurances of originality of printed materials and prevention of leaks of information.

A surface matching technology is, for example, if subjects are papers, a technology for registering an image of a fiber structure of a portion of a paper at which an original has been printed, the image serving as a characteristic particular to that paper, and when a document is to be matched, comparing an image of a fiber structure of the document with the particular characteristic of the paper to judge whether or not that document is the original.

Because distributions of fibers in paper are random, it is thought that the probability of there being two papers in which the states of entanglement of fibers are the same is extremely small. Therefore, surface matching technologies are considered extremely good as a method for judging authenticity of paper documents.

However, depending on types of subjects, reading the characteristics of surface conditions may be difficult. For example, with a high-quality paper such as a coated paper, because the surface is smooth, it is difficult to read a characteristic of a surface condition as is, and application of a surface matching technology may be difficult.

SUMMARY

According to an aspect of the invention, there is provided a surface-reading apparatus that includes a subject-flexing mechanism and a surface-reading component. The subject-flexing mechanism causes a subject to flex in one of a convex form and a concave form. The surface-reading component reads a characteristic of a surface condition of the subject that has been flexed by the subject-flexing mechanism.

BRIEF DESCRIPTION OF THE DRAWINGS

Exemplary embodiments of the present invention will be described in detail based on the following figures, wherein.

DETAILED DESCRIPTION

Herebelow, examples of embodiments of the present invention will be described in detail with reference to the drawings.

1. First Exemplary Embodiment of the Present Invention

—Structure—

A document verification apparatus 100 is an example of a subject verification apparatus of an exemplary embodiment of the present invention, and is used for verification of authenticity of documents (paper documents such as securities certificates, various kinds of title deeds, contracts, insurance certificates, residency registrations, birth certificates, warranties, travel tickets, bank notes, confidential papers and the like, and ID cards and the like) which are examples of subjects for exemplary embodiments of the present invention. Herein, it is sufficient for the subject to be a subject of which a surface can be read. As well as documents which are formed of papers such as high-quality paper, ordinary paper and the like, materials which can be flexed are included, such as various types of film, metal foils, thin metal plates and planographic printing plates. Electronic papers are also included as subjects.

Figure 1A:
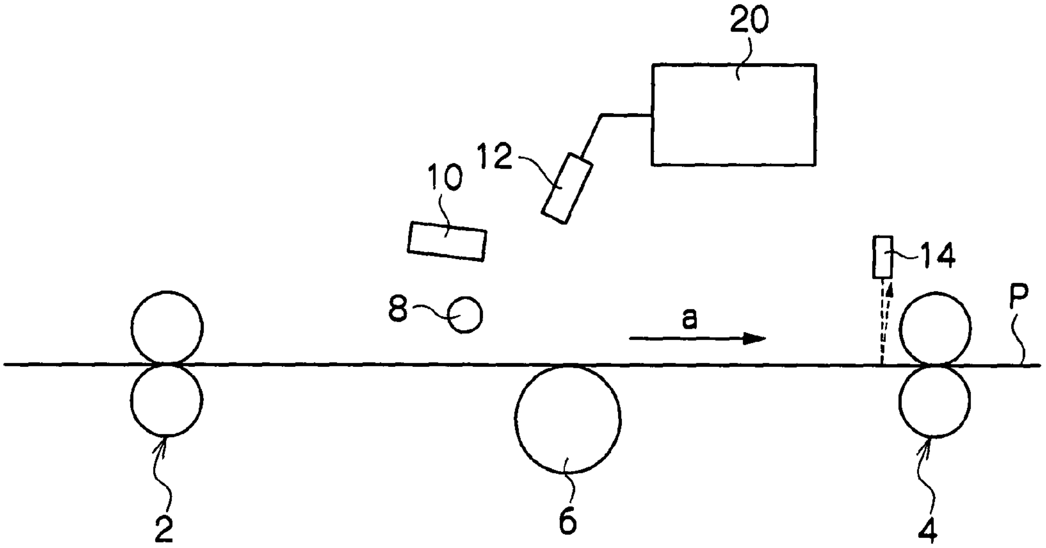
FIGS. 1A and 1B are schematic side views of a document verification apparatus relating to a first exemplary embodiment of the present invention.
Figure 2:
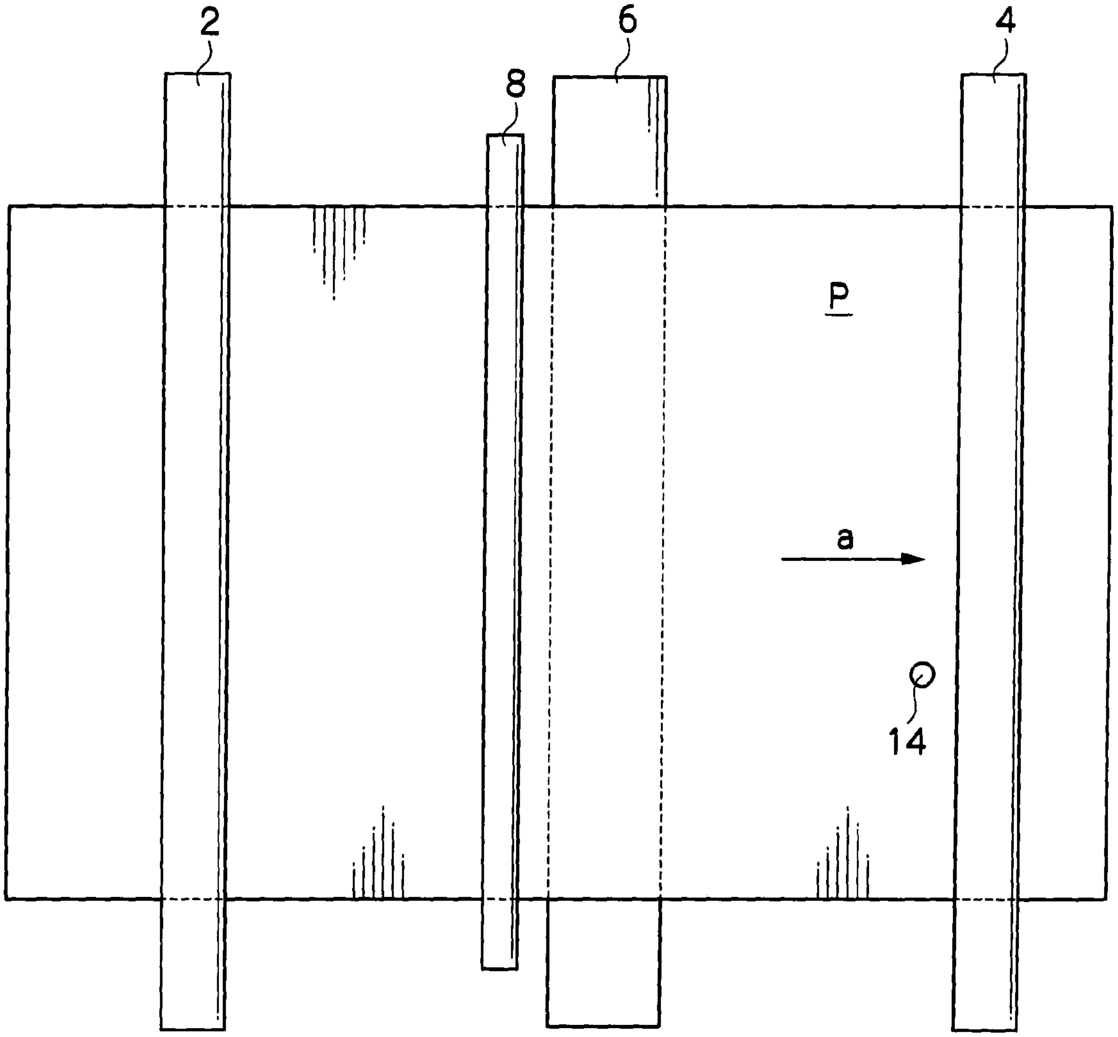
FIG. 2 is a schematic plan view of the document verification apparatus relating to the first exemplary embodiment of the present invention.

As shown in FIGS. 1A and 2, the document verification apparatus 100 is provided with a pair of conveyance rollers 2 and 4, a flexing roller 6, a flexing auxiliary roller 8, a light source 10, a reading section 12, an optical sensor 14 and a judgment computer 20. The conveyance rollers 2 and 4 nip a document P and convey the document P in a conveyance direction a. The flexing roller 6 is a roller which is provided in parallel with the conveyance rollers 2 and 4 below the conveyance path of the document P, between the conveyance rollers 2 and 4, and which causes the document P to flex by rising in a direction toward the conveyance path of the document P. The flexing auxiliary roller 8 is disposed at an opposite side of the conveyance path of the document P from the flexing roller 6, to sandwich the conveyance path. The light source 10 illuminates the document P that has been flexed by the flexing roller 6. The reading section 12 captures an image of an illuminated surface of the document P. The optical sensor 14 is disposed near the conveyance roller 4, at an upstream side therefrom with respect to the conveyance direction a, and optically senses the document P. The judgment computer 20 judges authenticity of the document P on the basis of the image which has been captured by the reading section 12. The light source 10 and the reading section 12 of the document verification apparatus 100 correspond to an illumination component and a surface-reading component, respectively, of exemplary embodiments of the present invention. The conveyance rollers 2 and 4, the flexing roller 6 and the flexing auxiliary roller 8 structure a subject-flexing mechanism of exemplary embodiments of the present invention. The conveyance rollers 2 and 4 and flexing roller 6 correspond to a subject retention portion of the subject-flexing mechanism, and the flexing roller 6 and flexing auxiliary roller 8 correspond to a subject-flexing member.

Figure 3A:
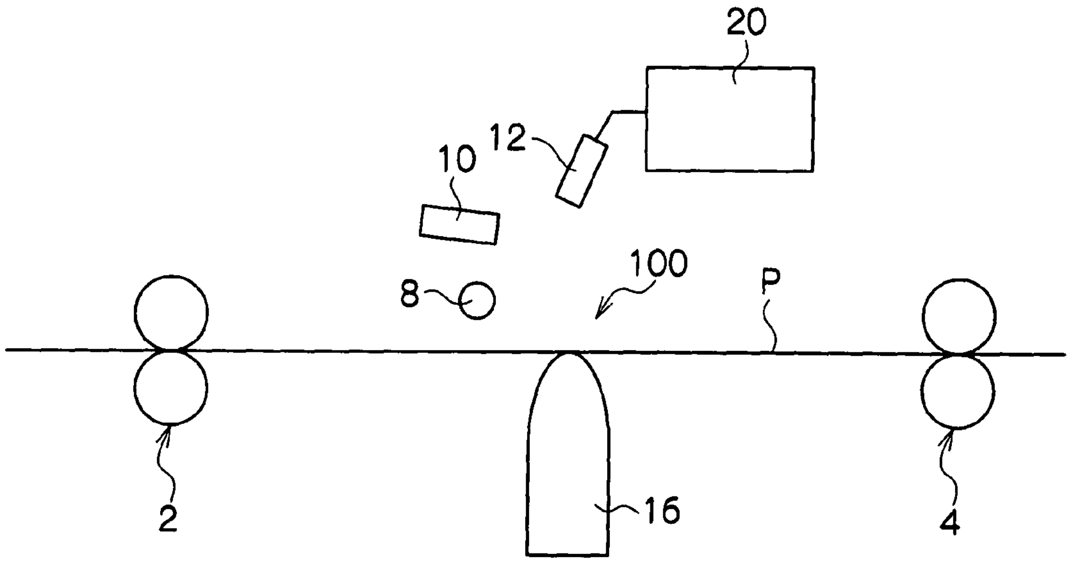
FIGS. 3A and 3B are schematic side views showing another example of a document verification apparatus relating to the first exemplary embodiment of the present invention.
Figure 3B:
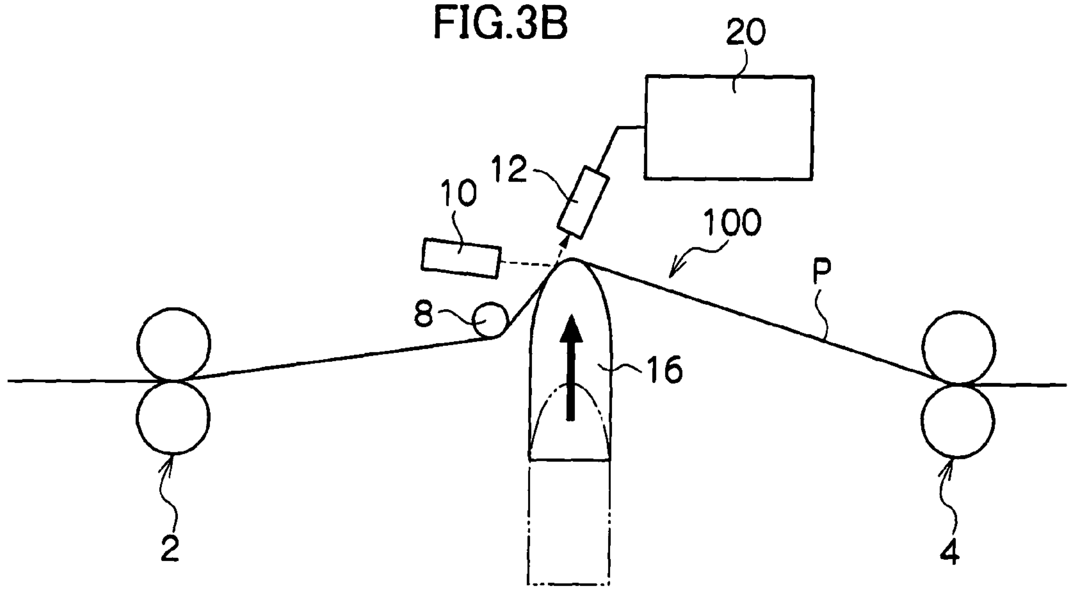
Figure 10:
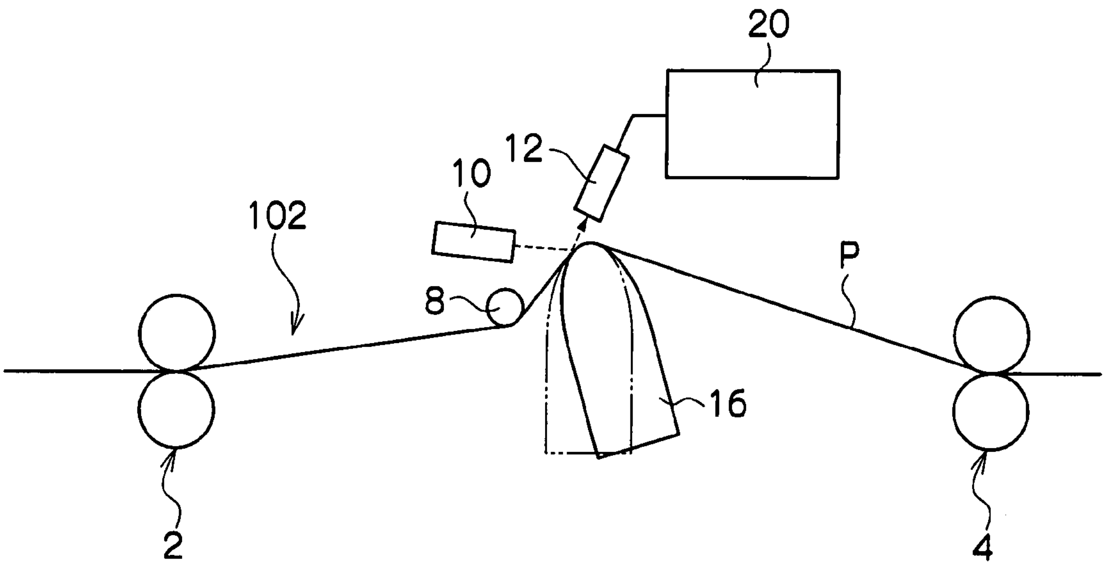
FIG. 10 is a schematic side view showing structure of a document verification apparatus of a second exemplary embodiment of the present invention.

In the document verification apparatus 100, instead of the flexing roller 6, a flexing guide 16 may be provided, as shown in FIGS. 3A and 3B. The flexing guide 16 is a plate-like member which extends across the whole width of the conveyance path of the document P, and an upper end thereof is formed with a curved surface shape. Furthermore, as shown in FIG. 10, an inclination angle of the flexing guide 16 in a raised state thereof may be alterable so as to vary a radius of curvature of the document P.

Below, structure of the document verification apparatus 100 will be described in further detail.

Figure 4:
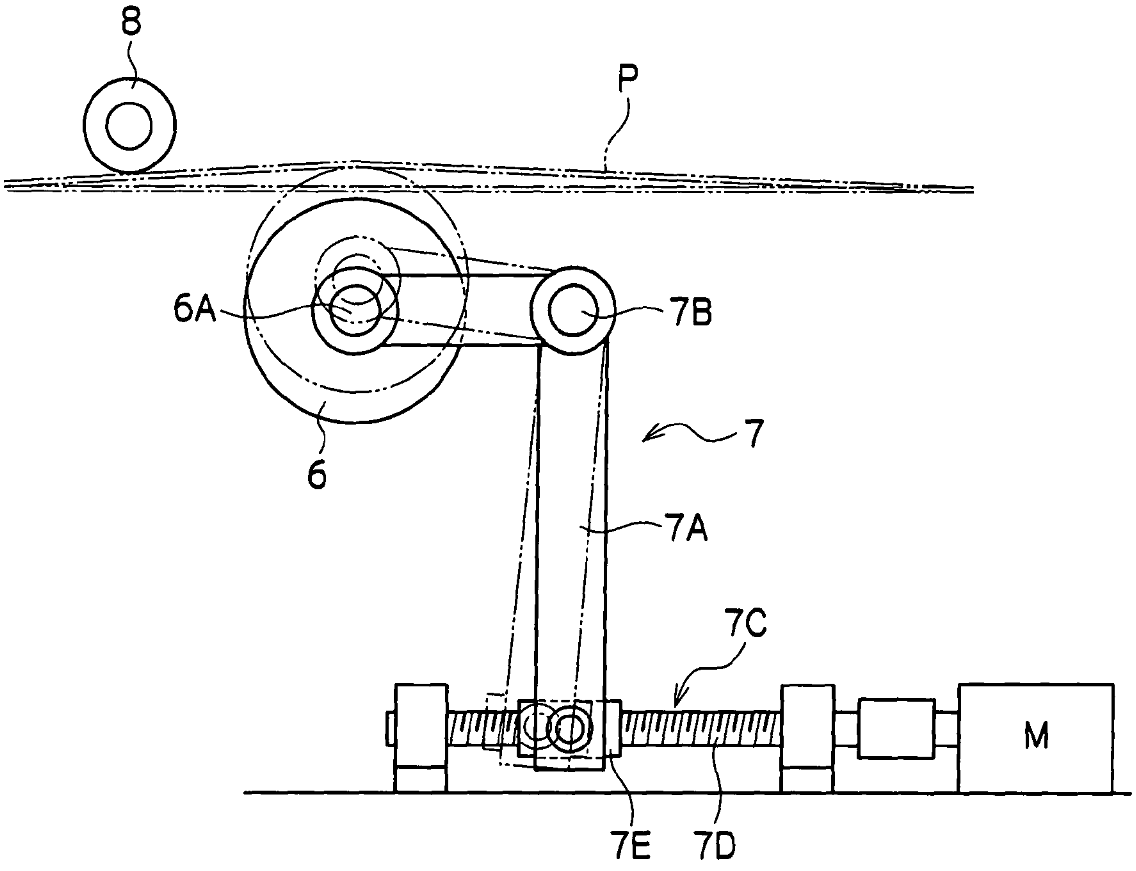
FIG. 4 is an enlarged view showing a flexing roller-raising and lowering mechanism which is provided at the document verification apparatus relating to the first exemplary embodiment of the present invention.

As shown in FIG. 4, a flexing roller-raising/lowering mechanism 7, which raises and lowers the flexing roller 6, is provided with an L-shaped arm member 7A, which swings about an axle 7B, and a ball-screw mechanism 7C, which causes the arm member 7A to swing. The ball-screw mechanism 7C is provided with a ball-screw 7D, which is turned by a motor M, and a nut portion 7E, which is assembled to the ball-screw 7D by a screwing operation. A lower end portion of the arm member 7A is rotatably attached to the nut portion 7E by an axle. An upper end portion of the arm member 7A is rotatably attached to the flexing roller 6 by an axle 6A. When the flexing roller 6 is at a lowered position, the nut portion 7E, the arm member 7A and the flexing roller 6 are at the positions shown by solid lines in FIG. 4. When the flexing roller 6 is to be raised to cause the document P to flex, the ball-screw 7D is turned and the nut portion 7E moves to the position shown by broken lines in FIG. 4. As a result, the arm member 7A swings from the position shown by solid lines to the position shown by broken lines. Therefore, the flexing roller 6 rises, and the document P is curved into a shape which protrudes toward the light source 10 and the reading section 12.

Here, when the document P is flexed, a radius of curvature in the range of about 15 to 30 mm is preferable. Therefore, a radius of the flexing roller 6 in the range of about 15 to 35 mm is preferable. However, this is just an example; the radius of curvature will differ in accordance with the subject.

Figure 1B:
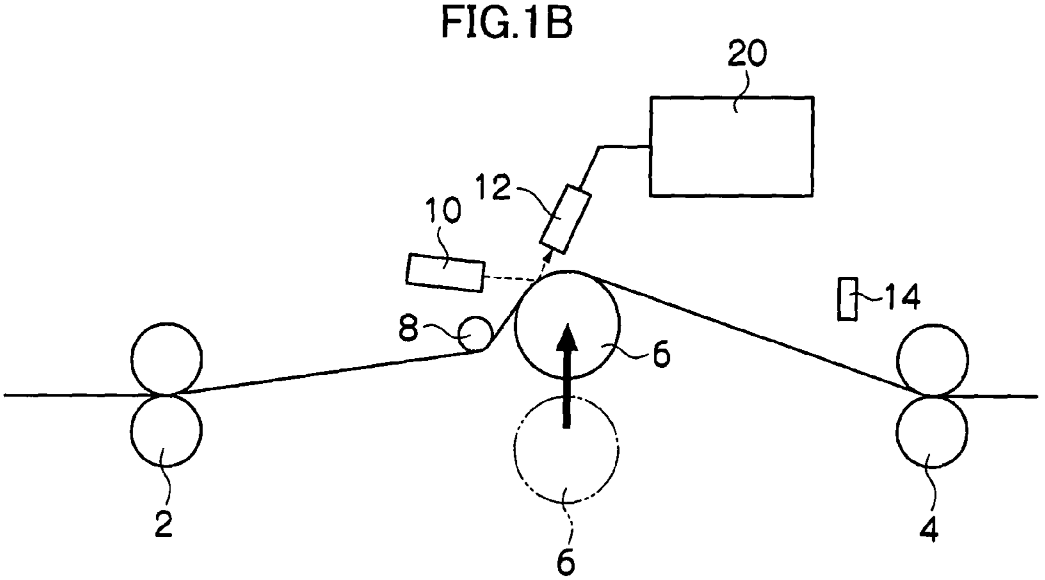

The light source 10 is fixed at a position from which light hits a curved portion of the document P when the flexing roller 6 is raised and the document P is flexed, as shown in FIGS. 1A and 1B. The reading section 12 is fixed at a position to be capable of receiving light from the light source 10 that has been incident on and reflected from the curved portion of the flexed document P. An illumination angle on the document P from the light source 10 is preferably in a range of about 300 to 800 relative to a line perpendicular to a portion of the curved portion of the document P at which the radius of curvature is smallest, that is, a portion of the portion that has been flexed by the flexing roller 6 at which an axis of light from the light source 10 meets the document P. The light source 10 may be provided such that the illumination angle on the document P can be altered within this range.

An LED, halogen lamp, fluorescent light, xenon lamp or the like can be employed as the light source 10.

Figure 5:
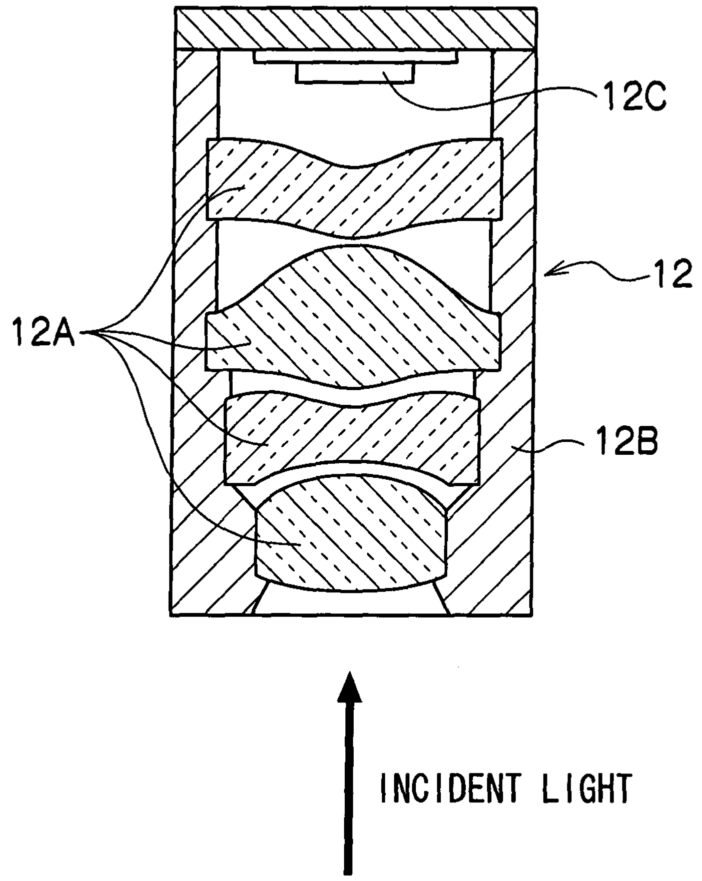
FIG. 5 is a sectional view, cut along an optical axis, of a reading section which is provided at the document verification apparatus relating to the first exemplary embodiment of the present invention.

As shown in FIG. 5, the reading section 12 is equipped with a lens unit 12A, a light-receiving section main body 12B and an image capture element 12C. The lens unit 12A is a sandwiched rectangular lens in which a plurality of lenses are superimposed in a thickness direction. The light-receiving section main body 12B has the form of a tube with a floor, accommodates the lens unit 12A and includes an opening portion at which light is incident. The image capture element 12C is disposed at a floor portion of the light-receiving section main body 12B. The image capture element 12C is provided such that a light-receiving surface thereof is disposed at a focusing point of the lens unit 12A. A CCD, a CMOS or the like can be employed as the image capture element 12C.

Figure 6:
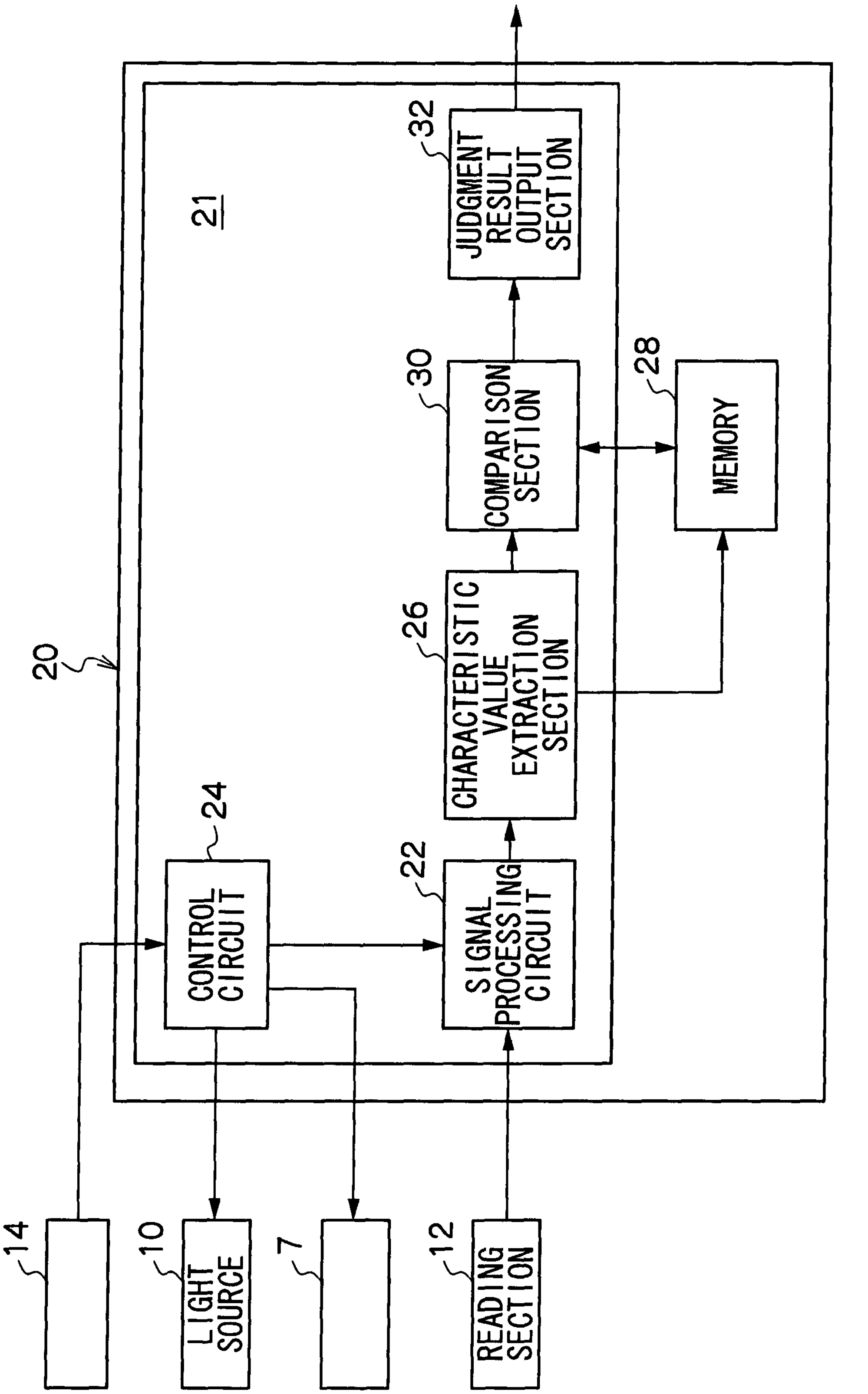
FIG. 6 is a block view showing structure of a judgment computer which is provided at the document verification apparatus relating to the first exemplary embodiment of the present invention.

The judgment computer 20 is an example of a computer for executing a subject verification program of the present invention, and is equipped with a CPU 21 and a memory 28, as shown in FIG. 6. The CPU 21 is provided with a signal processing circuit 22, a control circuit 24, a characteristic value extraction section 26, a comparison section 30 and a judgment result signal output section 32. The signal processing circuit 22 performs predetermined processing on signals of an image of the curved portion of the document P that the reading section 12 has read. The control circuit 24 inputs detection results from the optical sensor 14 and controls the signal processing circuit 22, the light source 10 and the flexing roller-raising/lowering mechanism 7. The characteristic value extraction section 26 serves as a characteristic extraction component, extracts a characteristic value of a non-reproducible random pattern from output signals from the signal processing circuit 22 and memorizes the extracted characteristic value at the memory 28. The comparison section 30 serves as a judgment component, compares the characteristic value extracted by the characteristic value extraction section 26 with a characteristic value registered in the memory 28, and judges authenticity of the document P (i.e., original or not original) on the basis of the comparison results. The judgment result signal output section 32 outputs an authenticity judgment result that has been judged by the comparison section 30. The memory 28 is a storage component which stores characteristic values extracted by the characteristic value extraction section 26 provided at the CPU 21.

At the CPU 21, when a signal indicating that the document P has been detected is inputted from the optical sensor 14, the control circuit 24 outputs control signals to the flexing roller-raising/lowering mechanism 7 and the light source 10, causing the flexing roller 6 to be raised toward the document P and at the same time lighting up the light source 10. Then, the control circuit 24 inputs a measurement commencement instruction to the signal processing circuit 22.

The signal processing circuit 22 receives the measurement commencement instruction from the control circuit 24, receives image signals including a non-reproducible random pattern which has been read by the reading section 12, performs the predetermined signal processing, such as amplification and the like, and then outputs results to the characteristic value extraction section 26. That is, image data that the reading section 12 has read from the document P is inputted to the characteristic value extraction section 26. Herein, the random pattern may utilize a fiber distribution which represents a dispersion state of fibers in the document P, disordered portions, which are portions at which printing on the document P is disordered, thickness variations of the document P, and so forth.

The characteristic value extraction section 26 performs extraction of the characteristic of the printed image from the inputted image data. The characteristic extraction is performed by, for example, the following procedure.

The reading results from the reading section 12 are divided up into meshes of a suitable size (a number of meshes d equals a height M×a width N) and quantized, a density of each mesh is represented by a density level q and sampled, and the reading results are converted to a mosaic-form image. From the image which has been quantized and sampled thus, if the density of a j-th mesh is $x_j$, this pattern is represented by a characteristic vector $x=(x_1, x_2, x_d)\cdot t$ (t being a transposition vector). A density of the corresponding image region is provided by each element of the characteristic vector. The pattern that is obtained is represented as a single point in a characteristic space that is spanned by the characteristic vector.

When the original of a document P is imaged, the characteristic value extraction section 26 finds the characteristic vector through the procedure described above, and saves the obtained characteristic vector to the memory 28 together with an identification number of the document P, to serve as characteristic information of the original. A method for associating information representing characteristic vectors with identification numbers is not particularly limited in the embodiments of the present invention but could be implemented by, for example, a table representing correspondences between characteristic vectors and identification numbers, and a portion or more of a data name of the information that a characteristic vector represents could be used in the identification number.

The comparison section 30 compares information representing the characteristic vector inputted from the characteristic value extraction section 26 (referred to as a 'calculated characteristic vector') with a characteristic vector that is the characteristic vector of the original which has been registered in the memory 28 (referred to as a 'registered characteristic vector'), and determines whether or not the document P is the original in accordance with a degree of similarity; that is, the comparison section 30 judges authenticity of the document P. The degree of similarity between the calculated characteristic vector and the registered characteristic vector which is used for this authenticity judgment can be found by calculating a distance between the calculated characteristic vector and the registered characteristic vector (a Euclidean distance, a Mahalanobis distance or the like). The shorter the distance that is found, the more similar the two vectors are shown to be. In the comparison section 30, of the registered characteristic vectors registered in the memory 28, the calculated characteristic vector may be compared with only a registered characteristic vector with a matching identification number (matching), or may be compared with all the registered vectors (identification).

For the present exemplary embodiment, an example of a case in which authenticity of the document P is judged by a distance between the calculated characteristic vector and the registered characteristic vector is described, the authenticity may be judged from an angle between the vectors. Furthermore, other than mosaic processing as described above, it may be possible to directly match images obtained by the image capture element and evaluate degrees of similarity by correlation values, cumulative squared errors and the like.

Further, other than identifying and/or matching the image obtained by the reading section 12 in real space, it may be possible to, for example, transform the obtained image into the frequency domain by a two-dimensional Fourier transform and identify or match the images in Fourier space. In such a case, a pre-registered image and an image of the subject printed article are combined in Fourier space, a correlation strength image is obtained by a reverse Fourier transform, and a degree of similarity of the two images can be evaluated from a peak value of this image. For example, if the size of an amplitude peak matches or exceeds a pre-set threshold, it is judged that the images match, that is, that the printed articles are the same.

Further, other than identifying/matching by an image data level as described above, the identification/matching may be implemented by the level of an extracted characteristic. For example, there are methods of calculating centers of gravity of microscopic points which are arranged in stripes (ink) and using distances between the centers of gravity, or positions thereof or the like, as characteristics. Such a method can describe a characteristic with less data than a data amount that is ordinarily handled for an image data level.

The comparison section 30 inputs a signal representing the authenticity judgment result of the document P, which has been judged by comparison of the calculated characteristic vector with the registered characteristic vector, to the judgment result signal output section 32. The judgment result signal output section 32 may cause the authenticity judgment result to be displayed at a display component, such as an LCD display, or may cause predetermined processing to be commenced at a downstream device or cause predetermined processing to be prevented.

At the judgment computer 20, an operation for judgment of a document P by the described procedure can be implemented by the following sequence of operations in the CPU 21 and the memory 28, in accordance with provision of a medium.

Figure 21:
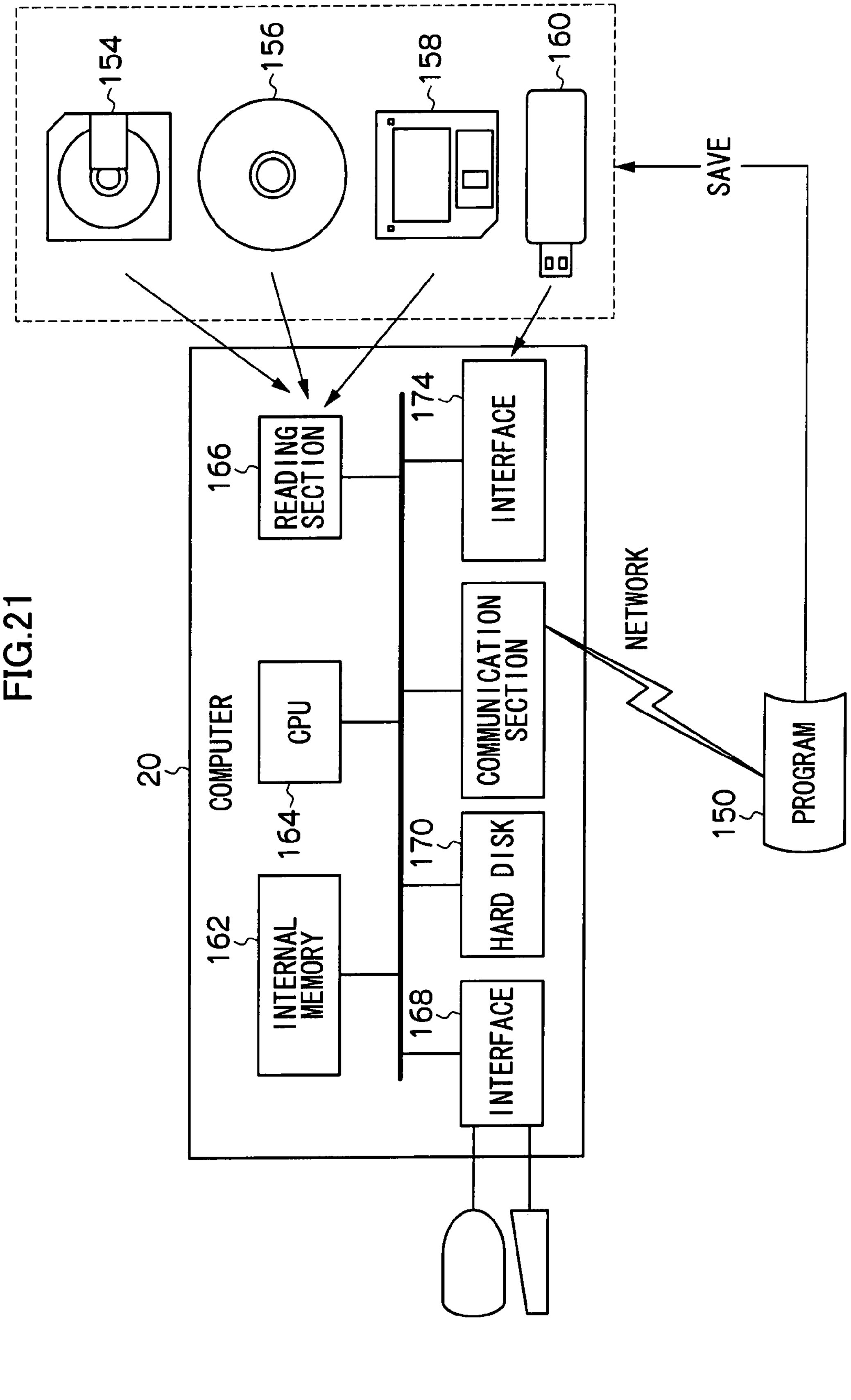
FIG. 21 is a block diagram showing an example of the judgment computer provided at the document verification apparatus relating to the first exemplary embodiment of the present invention, which is a structure that realizes functions of a signal processing circuit, a control circuit, a characteristic value detection section, the comparison section and a judgment result output section provided at the judgment computer with a computer program.

Herein, in the judgment computer 20, the functions of the signal processing circuit 22, the control circuit 24, the characteristic value extraction section 26, the comparison section 30 and the judgment result signal output section 32 provided at the CPU 21 may be implemented by a computer program. An example of this judgment computer 20 is shown in FIG. 21.

In the judgment computer 20 which is formed to realize these functions with a computer program, a part or all of the functions of the signal processing circuit 22, the control circuit 24, the characteristic value extraction section 26, the comparison section 30 and the judgment result signal output section 32 can be implemented by a subject verification program 150, which is a computer program. The subject verification program 150 itself, data that is used with the subject verification program 150 and suchlike can be stored at a storage medium which is readable by the computer. As shown in FIG. 21, the storage medium, is a medium at which it may be possible to induce energy-change states of magnetism, light, electricity or the like in accordance with descriptions of a program and to propagate the descriptions of the program to a reading section 166 with a format of signals corresponding to the energy changes. For example, the storage medium is a magneto-optical disk 154, an optical disk 156 (such as a CD, a DVD or the like), a magnetic disk 158, a memory 160 (such as an IC card, a memory card or the like) or the like. Naturally, the storage medium is not limited to being portable.

The subject verification program 150 is saved to the storage medium. Then, the recording medium is mounted and the subject verification program 150 which has been saved thereto is read out by, for example, the reading section 166 or an interface 174 of the judgment computer 20 and stored in an internal memory 162 or a hard disk 170. The subject verification program 150 is executed by a CPU 164 and can realize the functions of the signal processing circuit 22, the control circuit 24, the characteristic value extraction section 26, the comparison section 30 and the judgment result signal output section 32. The judgment computer 20 may also be connected with various other devices via an interface 168, and can be connected with, for example, a display device which displays information, an input device at which a user inputs information, and the like.

Naturally, it may be possible for a portion of the functions to be constituted by hardware or for all to be constituted by hardware. Furthermore, it may be possible to constitute a program which includes an exemplary embodiment of the present invention together with other structures.

—Operation—

Next, operation of the present exemplary embodiment will be described.

In order to judge authenticity of documents P at the document verification apparatus 100, characteristic vectors of the originals of the documents P must be pre-registered beforehand.

Registration of the characteristic vectors is carried out in accordance with the following procedure.

The original of a document P is nipped by the conveyance roller 2 and conveyed through the document verification apparatus 100 in the conveyance direction a. When the document P is nipped by the conveyance roller 4 as shown in FIG. 1A, the document P (the original) is sensed by the optical sensor 14.

Figure 7:
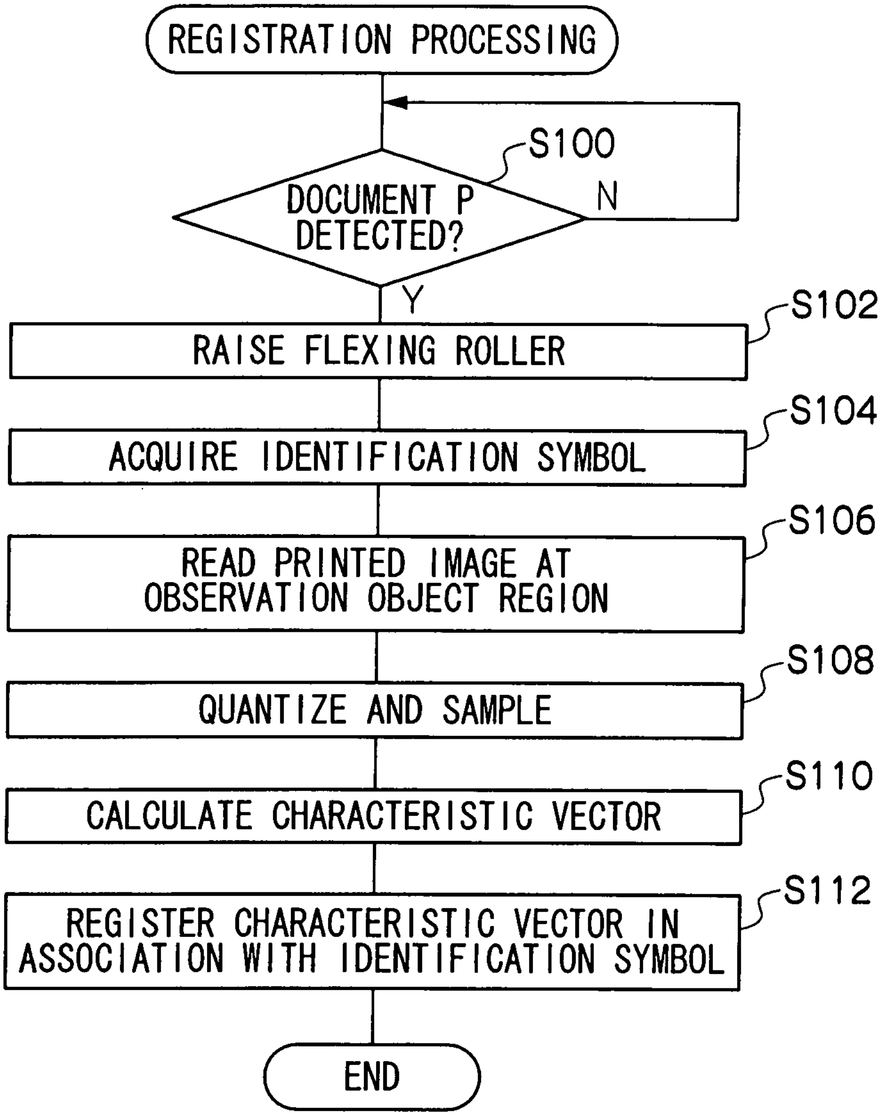
FIG. 7 is a flowchart showing a procedure for performing registration processing of a document original.

In step S100 of FIG. 7, a signal indicating that the document P has been detected is inputted from the optical sensor 14 to the control circuit 24 of the judgment computer 20, and in step S102, a stop instruction is inputted from the control circuit 24 to the conveyance rollers 2 and 4. The document P is nipped at predetermined positions and, at the same time, an instruction to raise the flexing roller 6 is inputted to the flexing roller-raising/lowering mechanism 7. The flexing roller 6 rises and, as shown in FIG. 1B, the document P flexes in the conveyance direction a.

When the flexing roller 6 has risen and the document P has curved, in step S1104, an identification symbol of the document P is acquired, and in step S106, an image within an observation region is read by the reading section 12.

The identification symbol of the document P may be inputted by an operator from an input component such as, for example, a keyboard or the like, and may be acquired by reading an image of a region that includes the identification symbol from the document P with the reading section 12 and performing OCR (optical character recognition) processing on results of this reading.

For reading of the image, an instruction for reading of the printed image is sent from the control circuit 24 to the reading section 12, an image in the observation region S is read by the reading section 12, and a signal representing results of this reading is received at the signal processing circuit 22. Predetermined signal processing is performed and image data representing the image within the observation region S is obtained. As mentioned earlier, this image data includes a non-reproducible random pattern from a time of printing.

When the image data has been acquired, in step S108, the image data is quantized into pre-specified steps and sampled by the characteristic value extraction section 26, to be converted to a mosaic image. Then, in step S110, a characteristic vector is calculated from the quantized and sampled image data.

When the characteristic vector of the image has been calculated, in step S112, data representing the characteristic vector is associated with the identification symbol that was acquired in step S104 and is saved to the memory 28 together with the identification symbol, and registration processing of the original is completed.

According to the procedure described above, as a characteristic quantity of a document P that has been loaded at the reading section 12, a characteristic vector of an image in the observation region S (i.e., the registered characteristic vector) is registered to the memory 28 in association with that document P.

Here, the document P and the registered characteristic could be associated by encoding data representing the registered characteristic (the registered characteristic vector) or the like and printing the data onto the document P itself. In such a case, the memory 28 may be omitted.

Next, a procedure for judging authenticity of a document P by matching will be described.

A document P that is to be matched is nipped by the conveyance roller 2 and conveyed through the document verification apparatus 100 in the conveyance direction a. When the document P is nipped by the conveyance roller 4 as shown in FIG. 1A, the document P is sensed by the optical sensor 14.

Figure 8:
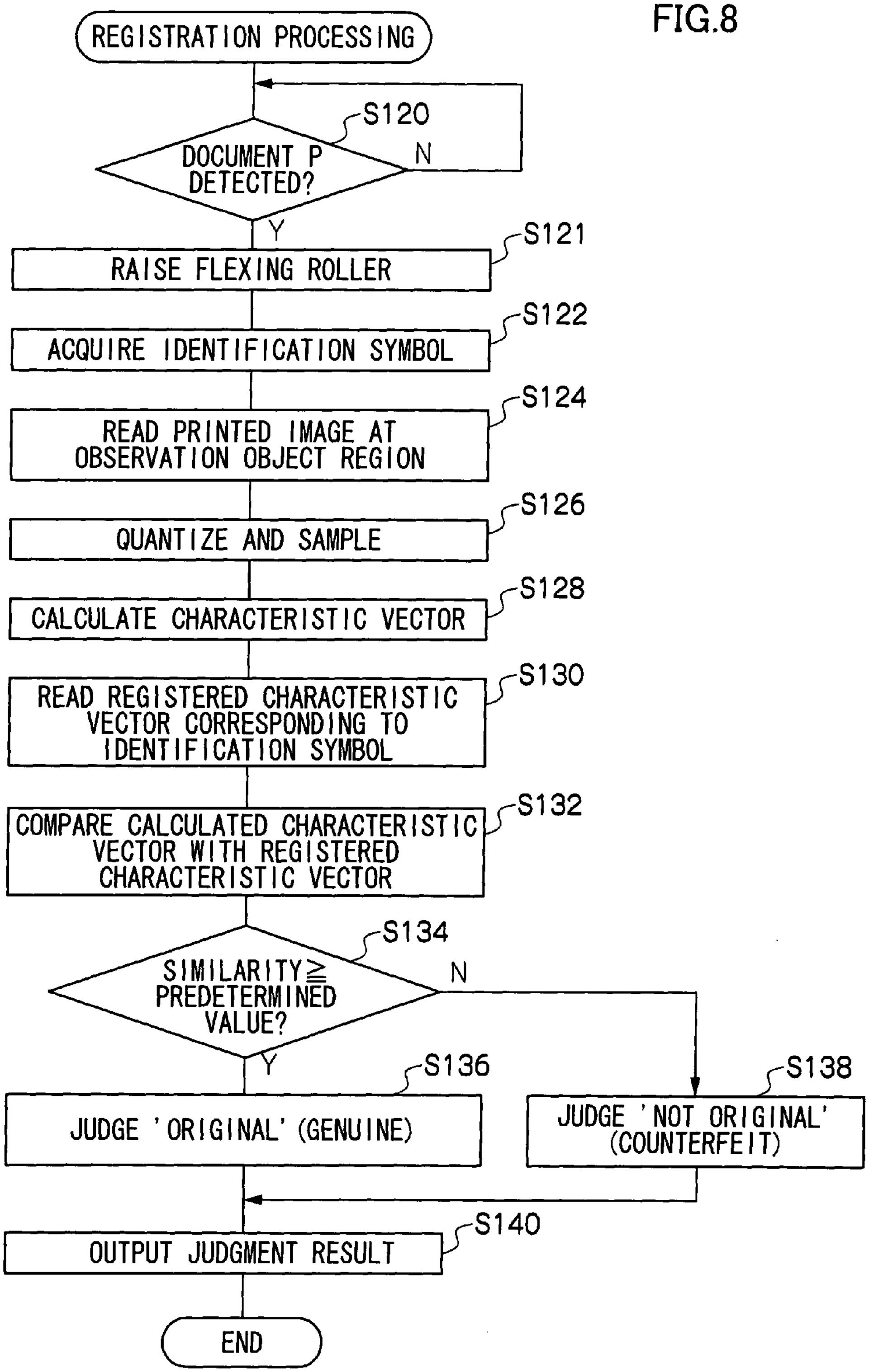
FIG. 8 is a flowchart showing a procedure for judging authenticity of a document by matching.

In step S120 of FIG. 8, a signal indicating that the document P has been detected is inputted from the optical sensor 14 to the control circuit 24 of the judgment computer 20, and in step S121, a stop instruction is inputted from the control circuit 24 to the conveyance rollers 2 and 4. The document P is nipped at predetermined positions and, at the same time, an instruction to raise the flexing roller 6 is inputted to the flexing roller-raising/lowering mechanism 7. The flexing roller 6 rises and, as shown in FIG. 1B, the document P flexes in the conveyance direction a.

When the flexing roller 6 has risen and the document P has curved, in step S122, an identification symbol of the document P is acquired, and in step S124, an image within the observation region S is read by the reading section 12. Then, image data representing the image in the observation region S, which is obtained from results of the reading, is quantized into pre-specified steps, sampled and converted to a mosaic image in step S126, and the characteristic vector is calculated in step S128. Because the processing of steps S120 to S128 is similar to the registration processing (steps S100 to S108 of FIG. 7), detailed descriptions will not be given.

When the characteristic vector has been calculated, in step S130, of all the registered characteristic vectors which have been registered in the memory 28, the registered characteristic vector corresponding to the identification symbol acquired in step S122 is selected and read out by the comparison section 30. In step S132, the characteristic vector calculated in step S1128 and the registered characteristic vector that has been read out are compared by the comparison section 30. If the result of this comparison is that a degree of similarity of the two vectors matches or exceeds a predetermined threshold specified in advance, processing flows from step S134 to step S136 and it is judged that the matching object document P is the 'original' (the genuine article), but in other cases, the processing flows from step S134 to step S138 and it is judged that the document P is 'not original' (a counterfeit).

More specifically, a distance between the calculated characteristic vector and the registered characteristic vector is found, and if this distance is shorter than the predetermined threshold specified in advance, the judgment is 'original', and if the distance is longer than the threshold, the judgment is 'not original'. For the threshold that is used here, the threshold may be specified with a predetermined tolerance range in expectation of errors in the registered characteristic vector and the calculated characteristic vector (errors in reading by the reading section 12, errors in quantization and sampling, etc.). In other words, a size of the threshold may be suitably selected in accordance with the need to carry out authenticity judgments strictly or generously.

Furthermore, because malfunctions such as various operational errors, mispositioning and the like may occur at times of matching, a final judgment may be obtained by judgment results of a number of repetitions, and re-tries may be allowed until it has been judged from comparison results that the printed article is not the original a predetermined number of times.

Meanwhile, in a case in which data representing the registered characteristic vector has been encoded and printed onto the surface (or a rear face) of the document P, it may be possible to read this data from the surface (or rear face) of the document P with the reading section 12 (or a dedicated reading component) and use this data for matching.

Finally, in step S140, a signal representing the judgment result of 'original' or 'not original' is outputted from the judgment result signal output section 32, and the matching processing ends.

For the matching processing described above, a case in which a registered characteristic vector corresponding with an identification symbol is selected and the calculated characteristic vector and the registered characteristic vector are compared one-to-one has been described. However, if a number of sets of registration data in the memory 28 is small, rather than utilizing an identification symbol, a calculated characteristic vector may be compared with all the registered characteristic vectors.

Figure 9:
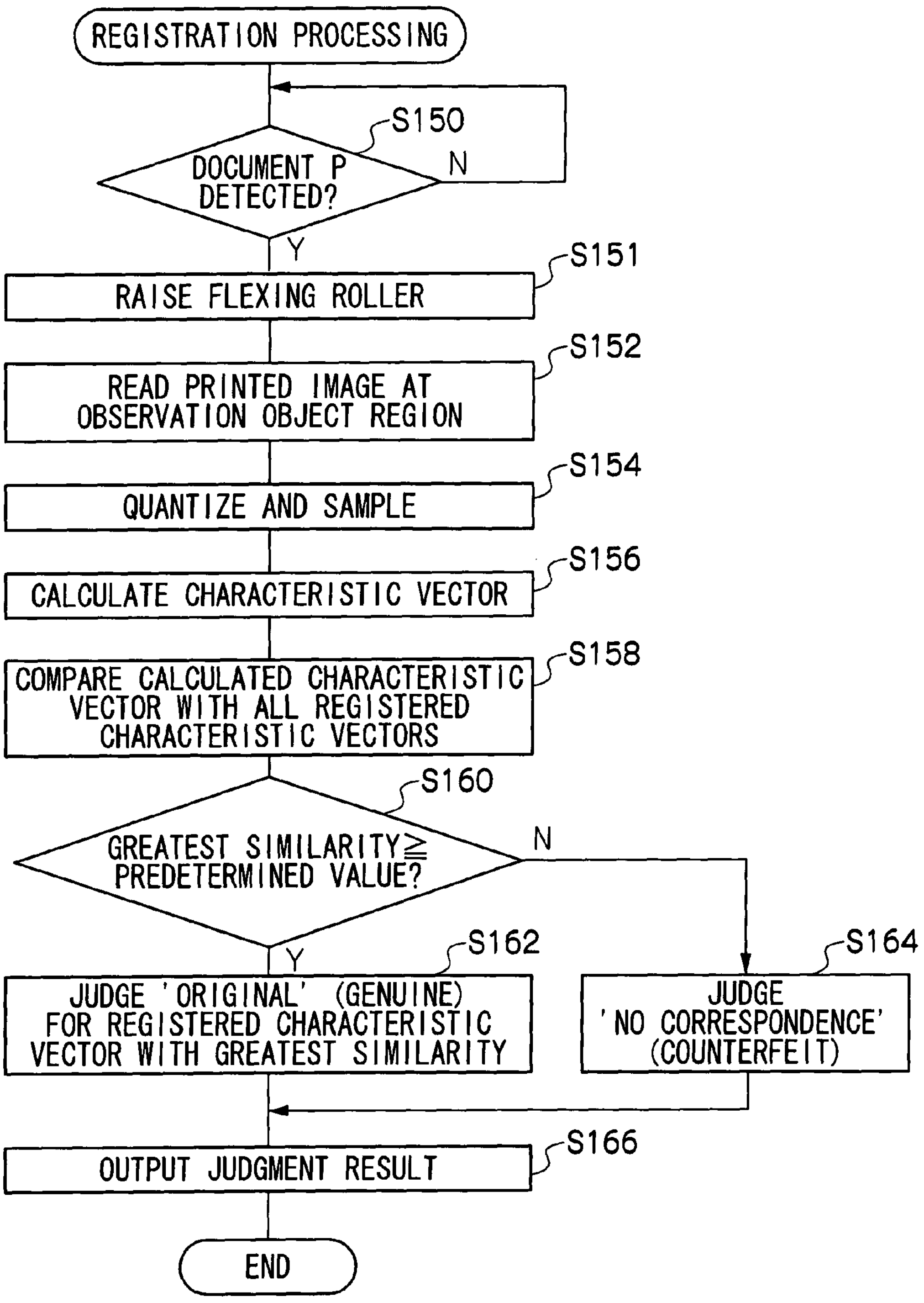
FIG. 9 is a flowchart showing a procedure for comparing a calculated characteristic vector of a document with all registered characteristic vectors and judging authenticity of the document.

A procedure for a case of comparing a calculated characteristic vector with all registered characteristic vectors is shown in FIG. 9.

As shown in FIG. 9, in this verification processing, an identification symbol is not required, so the processing step for acquiring the identification symbol of a document P can be omitted. Accordingly, in step S150 of FIG. 9, a signal indicating that the document P has been sensed is inputted from the optical sensor 14 to the control circuit 24 of the judgment computer 20, and in step S151, a stop instruction is inputted from the control circuit 24 to the conveyance rollers 2 and 4. The document P is nipped at predetermined positions and, at the same time, an instruction to raise the flexing roller 6 is inputted to the flexing roller-raising/lowering mechanism 7. The flexing roller 6 rises and, as shown in FIG. 1B, the document P flexes in the conveyance direction a.

When the flexing roller 6 has risen and the document P has curved, an image within the observation region S is read by the reading section 12 in step S152, quantization and sampling are performed in step S154, and calculation of the characteristic vector is performed in step S156.

In step S158, the calculated characteristic vector that has been calculated is respectively compared by the comparison section 30 with all the registered characteristic vectors that have been registered in the memory 28. Then, in step S160, it is judged whether or not a highest similarity value, which is the highest of degrees of similarity between the registered characteristic vectors and the calculated characteristic vector, is at or above a predetermined threshold which has been specified in advance. If the highest similarity value equals or exceeds the threshold, the processing advances to step S1162 and it is judged that the matching object document P is an 'original' (genuine). On the other hand, if the highest similarity value is less than the threshold, the processing advances to step S164 and it is judged that the document P has 'no correspondence' (is a counterfeit).

That is, respective distances between the calculated characteristic vector and all the registered characteristic vectors are found and, basically, the registered printed article whose registered characteristic vector has the shortest distance from the calculated characteristic vector is judged to be the original, but if even the shortest distance is a distance further than the pre-specified threshold, then 'no correspondence' with the registered printed articles is judged.

For the threshold that is used here, the threshold may be specified with a predetermined tolerance range applied, similarly to the case of matching processing. Furthermore, because malfunctions such as various operational errors, mispositioning and the like may occur at times of matching, a final judgment may be obtained by judgment results of a number of repetitions, and re-tries may be allowed until it has been judged from comparison results that the printed article is not an original a predetermined number of times.

Then, in step S166, a signal representing the judgment result of 'original' or 'no correspondence' is outputted from the judgment result signal output section 32, and the identification processing ends.

Thus, in the present exemplary embodiment of the invention, a random pattern of a non-reproducible image of a document P is used for identification matching processing, a characteristic of a random pattern of a non-reproducible image at a previously legitimized document P (original) has been pre-registered, and authenticity (original/not original) of the verification object document P is determined by comparison with a characteristic according to the non-reproducible random pattern of the verification object document P.

Figure 18A:
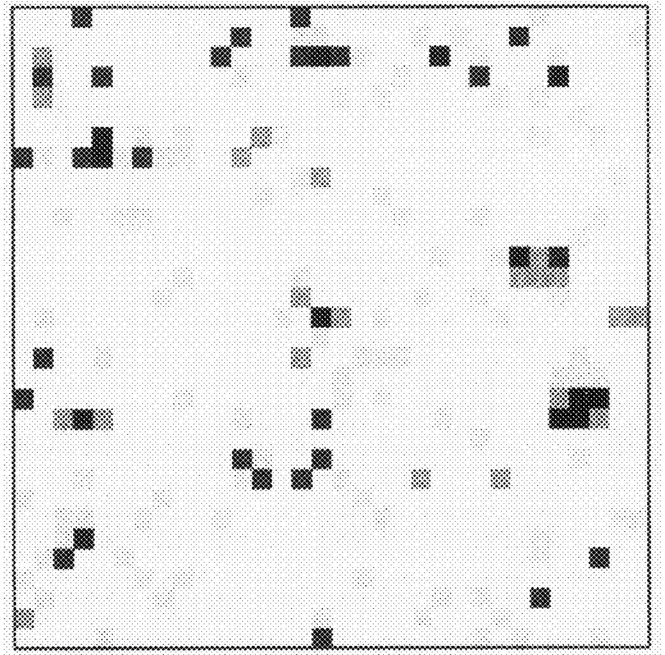
FIGS. 18A and 18B are explanatory views showing mosaic images of a document, which are obtained by the document verification apparatus relating to the first exemplary embodiment of the present invention, for a case in which the document is not flexed and a case in which the document is flexed.
Figure 18B:
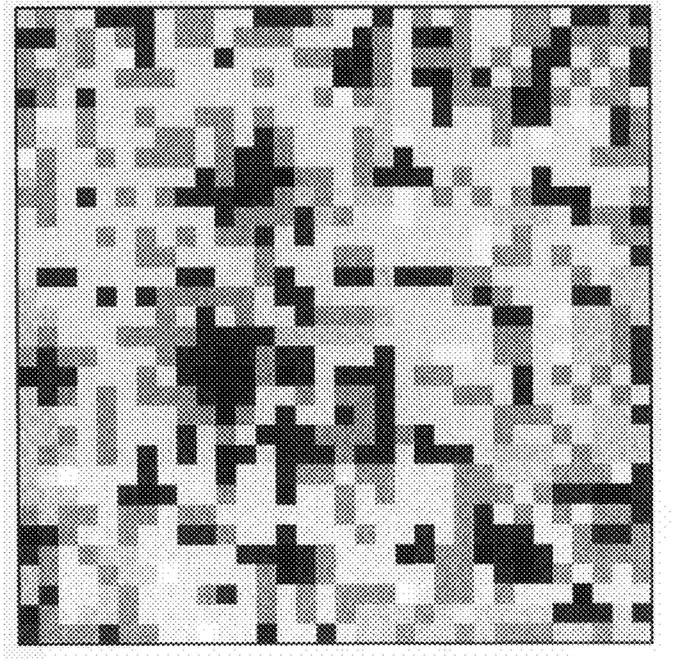

FIGS. 18A and 18B show examples of mosaic images obtained by image data being converted by the characteristic value extraction section 26 in step S108 of the present exemplary embodiment of the invention. FIG. 18A shows a mosaic image when a radius of curvature of the document P is infinitely large, that is, when the document P is not flexed, and FIG. 18B shows a mosaic image when the document P is flexed to a radius of curvature of 25 mm. Here, coated paper made by Fuji Xerox Co., Ltd. (N color 127) is employed as the document P.

As can be seen from FIG. 18A, when the document P is not flexed, there are many blank areas in the mosaic image. In contrast, when the document P is flexed, as can be seen from FIG. 18B, the mosaic image has a clear pattern of black, white and grays. Accordingly, it is understood that the surface of the document P can be more distinctly read by flexing the document P and reading the surface.

Figure 19:
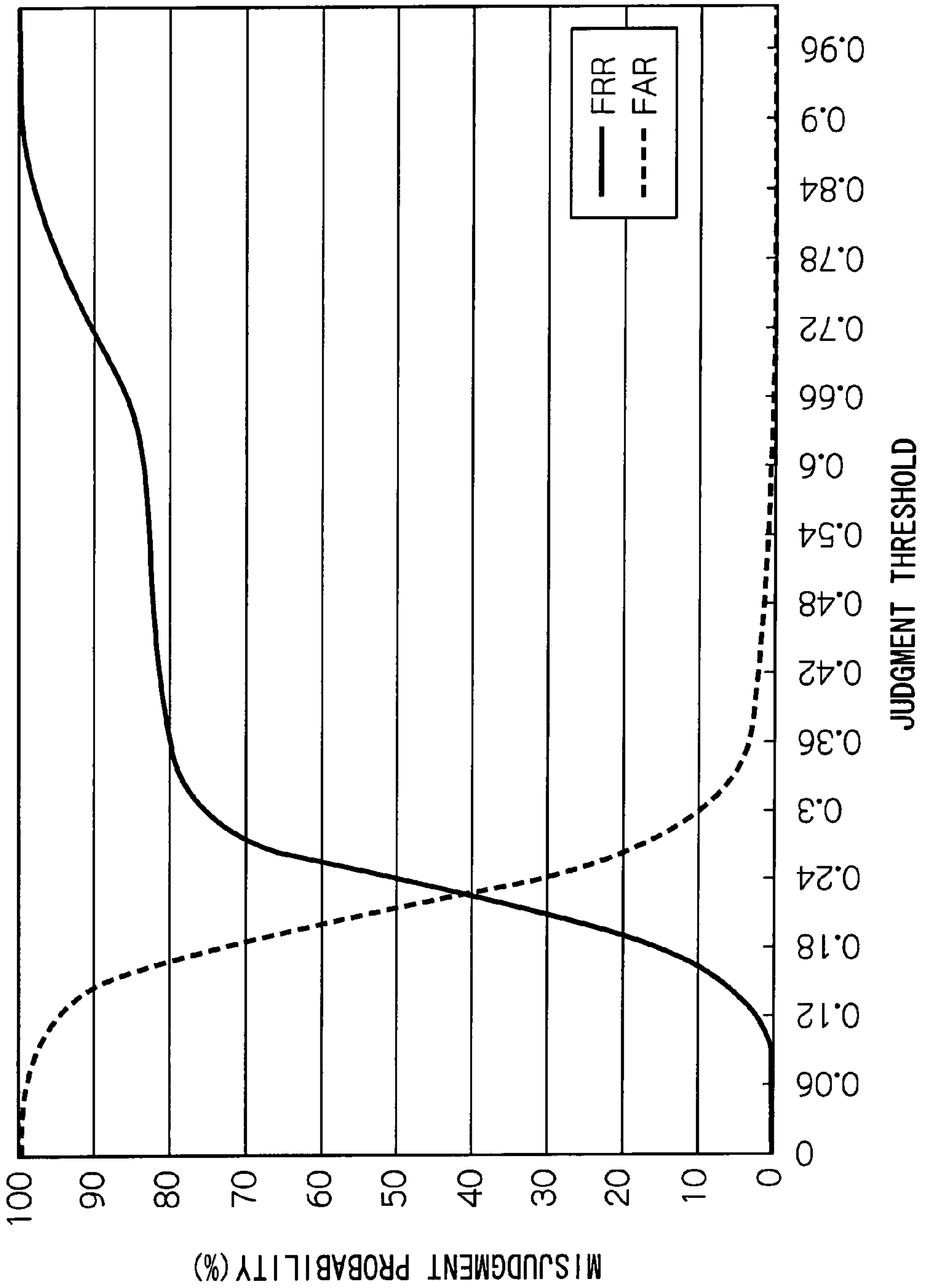
FIG. 19 is a graph showing relationships between size of a threshold value specified in a comparison section, which is provided at the document verification apparatus relating to the first exemplary embodiment of the present invention, and probabilities of misjudging authenticity of documents, for cases in which the documents are not flexed.
Figure 20:
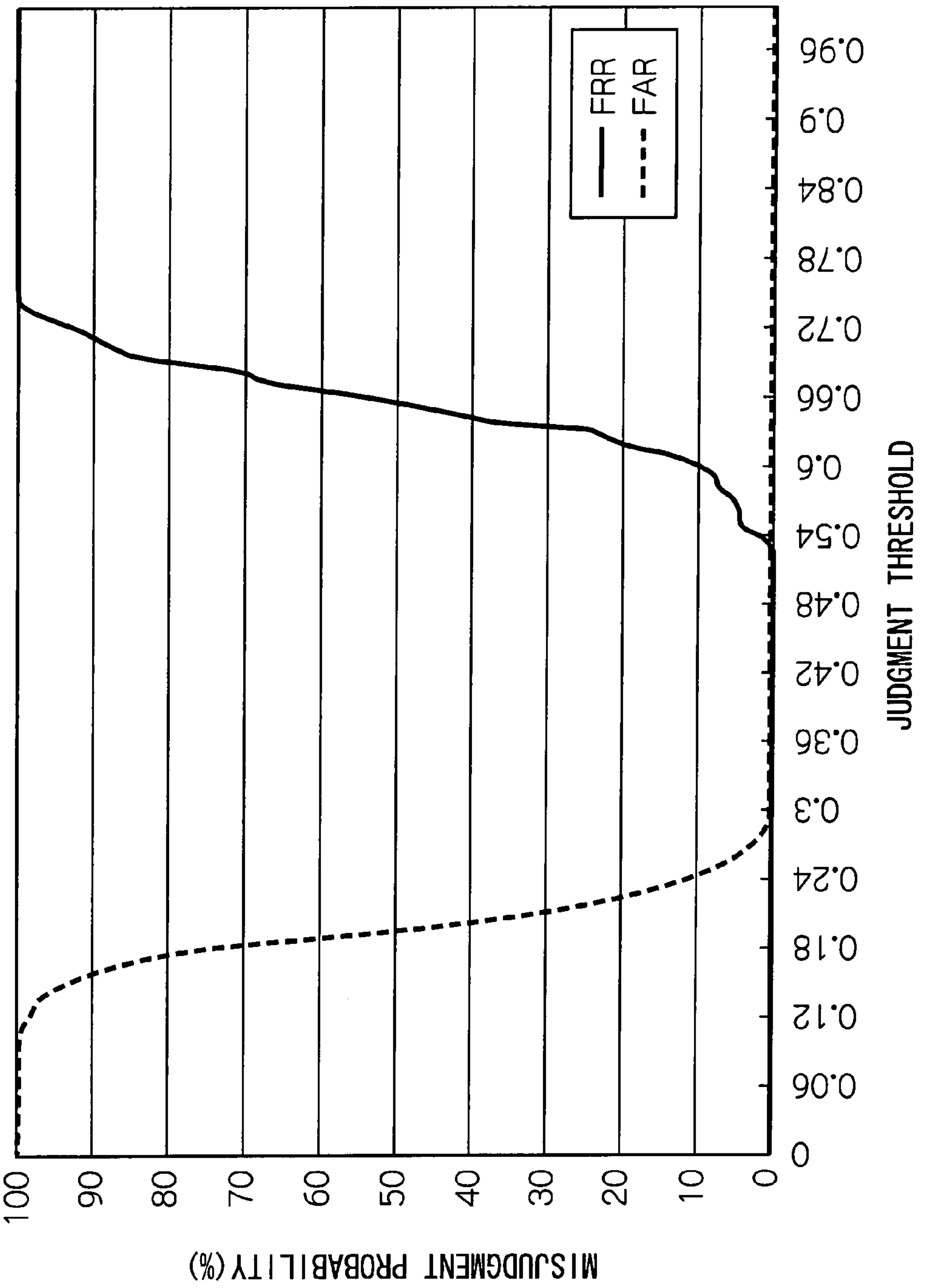
FIG. 20 is a graph showing relationships between size of the threshold value specified in the comparison section provided at the document verification apparatus relating to the first exemplary embodiment of the present invention and probabilities of misjudging authenticity of documents, for cases in which the documents are flexed to a flexing radius of 25 mm.

Relationships between the size of the threshold value specified at the comparison section 30 and probabilities of misjudgments of authenticity of documents P are shown in FIGS. 19 and 20. In FIGS. 19 and 20, FRR is a probability of misjudgment of a genuine article as counterfeit and is shown by solid lines, and FAR is a probability of misjudging a counterfeit as a genuine article and is shown by broken lines. FIG. 19 shows relationships between the threshold and misjudgment probabilities when the document P is not flexed, and FIG. 20 shows relationships between the threshold and misjudgment probabilities when the document P is flexed to a radius of curvature of 25 mm.

As is shown in FIGS. 19 and 20, when the threshold is small, FRR is small and FAR is large. On the other hand, when the threshold is large, FRR is large and FAR is small. When the document P is not flexed, as shown in FIG. 19, a region in which FRR is small and FAR is large and a region in which FRR is large and FAR is small overlap, and there is no region where FRR and FAR are both at zero. This indicates that there is no range of the threshold at which neither genuine articles are misjudged as counterfeits nor counterfeits are misjudged as genuine articles.

In contrast, when the document P is flexed to a radius of curvature of, for example, 25 mm, as shown in FIG. 20, both FRR and FAR are at zero in a range of threshold values from 0.3 to 0.57. This indicates that both misjudgments of genuine articles as counterfeits and misjudgments of counterfeits as genuine articles can be prevented by setting the threshold in this range.

Besides papers with smooth surfaces such as coated papers, characteristics of surface conditions of, for example, ordinary papers may be read in the state of being flexed by the flexing roller 6. Similarly to a paper with a smooth surface such as a coated paper, protrusions and indentations of the surface at the apex are physically emphasized, and angles at which light from the light source 10 meets the surface are not uniform.

2. Second Exemplary Embodiment of the Present Invention

In a document verification apparatus 102 of a second exemplary embodiment of the present invention, the flexing guide 16, of the document verification apparatus of the mode shown in FIGS. 3A and 3B, is raised toward the document P and, in a state in which the document P is flexed, a peak portion of the flexing guide 16 is inclined toward the conveyance roller 2 disposed at the upstream side with respect to the conveyance direction A. Thus, the document verification apparatus 102 is an example in which curvature of the curved portion of the document P can be altered.

As shown in FIG. 10, the flexing guide 16 has a wedge-like cross-section in which an upper end portion narrows toward the upper side, a top end face having a smallest radius of curvature and a side face having a larger radius of curvature than the top end face.

Figure 11:
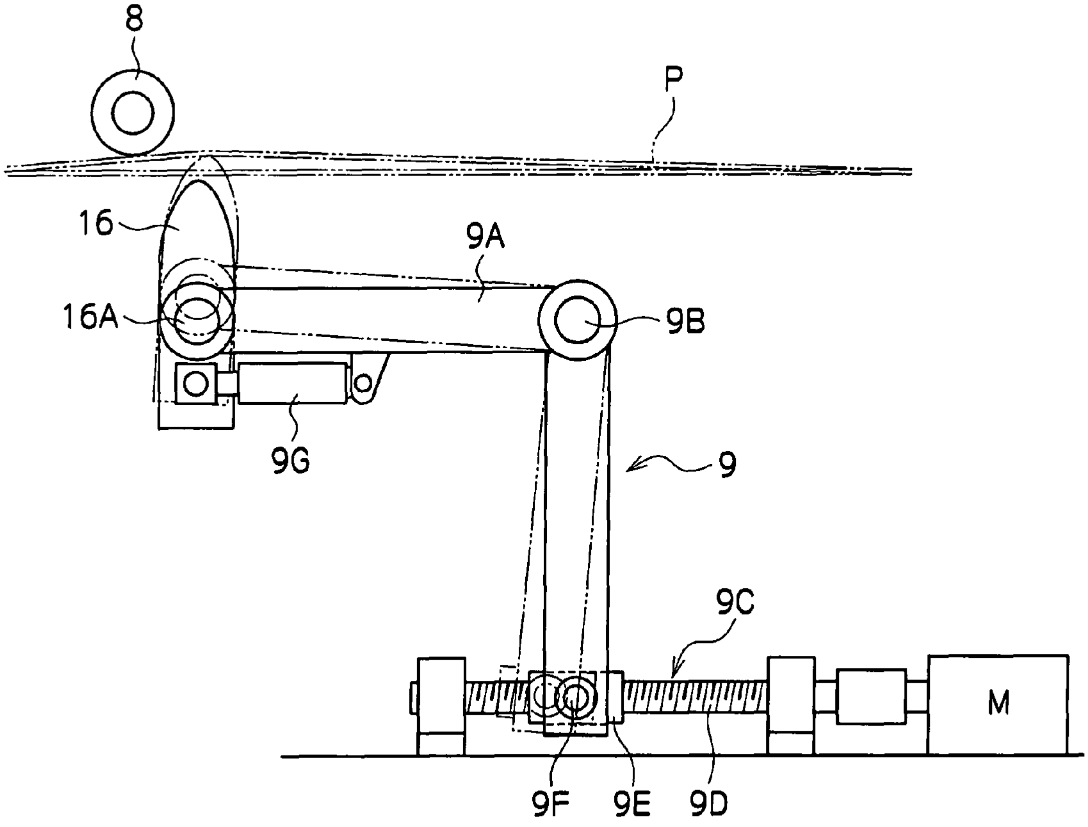
FIG. 11 is an enlarged view showing a flexing guide-raising and lowering mechanism which is provided at the document verification apparatus of the second exemplary embodiment of the present invention.

As shown in FIG. 11, a flexing guide-raising and lowering mechanism 9, which raises and lowers the flexing guide 16, is provided with an L-shaped arm member 9A, which swings about an axle 9B, and a ball-screw mechanism 9C, which causes the arm member 9A to swing. The ball-screw mechanism 9C is provided with a ball-screw 9D, which is turned by a motor M, and a nut portion 9E, which is assembled to the ball-screw 9D by a screwing operation. A lower end portion of the arm member 9A is rotatably attached to the nut portion 9E by an axle 9F. An upper end portion of the arm member 9A is rotatably attached to the flexing guide 16 by an axle 16A. An actuator 9G for inclining the flexing guide 16 is also attached at the upper end portion of the arm member 9A.

When the flexing guide 16 is at a lowered position, the nut portion 9E, the arm member 9A and the flexing guide 16 are at the positions shown by solid lines in FIG. 11. When the flexing guide 16 is to be raised to cause the document P to flex, the ball-screw 9D is turned and the nut portion 9E moves to the position shown by broken lines in FIG. 11. As a result, the arm member 9A swings from the position shown by solid lines to the position shown by broken lines. Therefore, the flexing guide 16 rises, and the document P is curved.

Figure 12:
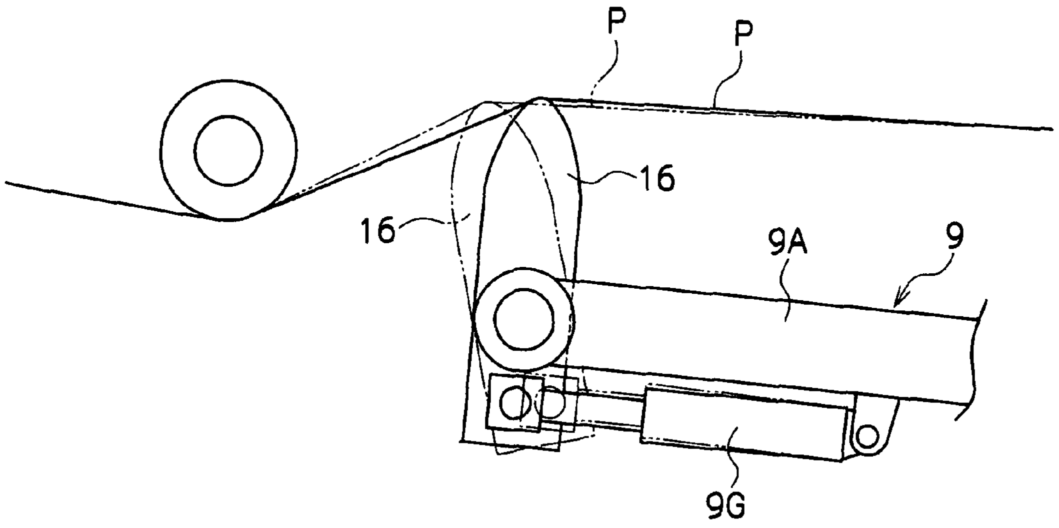
FIG. 12 is an enlarged view showing a mechanism for altering an angle of a flexing guide at the flexing guide-raising and lowering mechanism shown in FIG. 11.

The inclination of the flexing guide 16 is altered by the actuator 9G in order to alter curvature of the document P in the state in which the document P is flexed by the flexing guide 16. As shown by the solid lines in FIG. 12, when the document P is flexed by the flexing guide 16 being raised in a vertical state, a portion of the flexing guide 16 with a relatively large radius of curvature, between the top end face and the side face, touches against the document P, so curvature of the document P is large. If the actuator 9G is shortened and the flexing guide 16 is turned in an anticlockwise direction, as shown by the broken lines in FIG. 12, a portion at the top end of the flexing guide 16 with a small radius of curvature touches against the document P, so the radius of curvature of the document P is smaller than when the flexing guide 16 is vertical. Conversely, if the actuator 9G is extended and the flexing guide 16 is turned in the clockwise direction, a portion at the side face of the flexing guide 16 with a large radius of curvature touches against the document P, so the radius of curvature of the document P is even larger than when the flexing guide 16 is vertical.

In the document verification apparatus 102, a subject-flexing mechanism is formed by the flexing guide 16 and the flexing guide-raising and lowering mechanism 9.

Except in the respects described above, structures and operations of the document verification apparatus 102 are similar to the document verification apparatus relating to the first exemplary embodiment of the present invention.

The document verification apparatus 102 features the following characteristic in addition to the characteristics that the document verification apparatus 100 features. Specifically, even with the same subject, there are many different patterns of the surface with different curvatures. Therefore, even at the same portion of the same subject, a plurality of patterns can be obtained by varying the curvature. Hence, if a subject is not judged to be an original unless all of plural patterns match, a misjudgment such that a counterfeit is judged genuine can be prevented even in a case in which one pattern has been counterfeited.

3. Third Exemplary Embodiment of the Present Invention

Figure 13A:
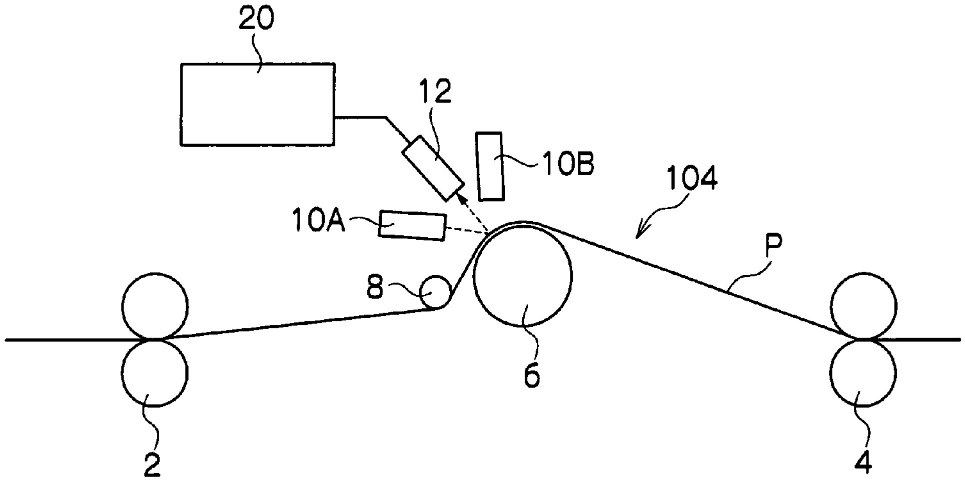
FIGS. 13A and 13B are schematic side views showing structure of a document verification apparatus of a third exemplary embodiment of the present invention.
Figure 13B:
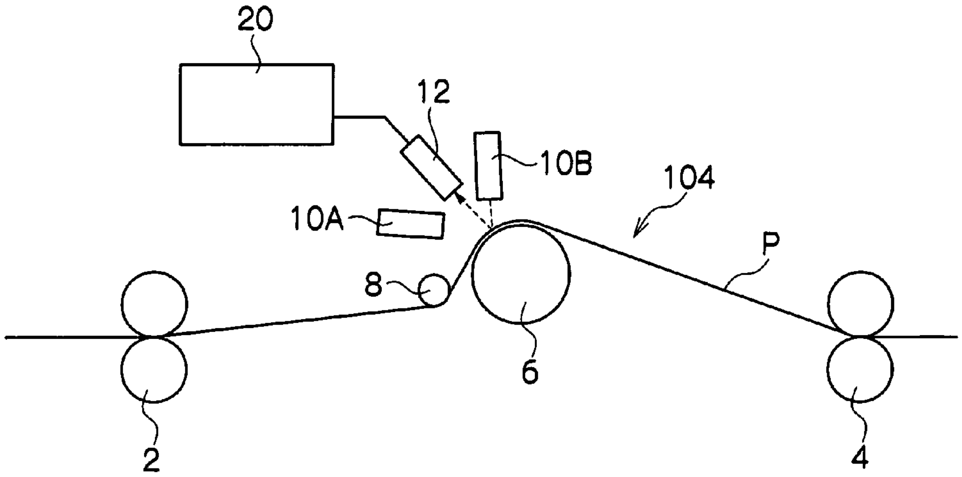

As shown in FIGS. 13A and 13B, in a document verification apparatus 104 relating to a third exemplary embodiment of the present invention, the reading section 12 is disposed so as to be sandwiched by light sources 10A and 10B. The document verification apparatus 104 is structured such that the light source 10A and the light source 10B will not light simultaneously. Therefore, light is illuminated onto the document P from different illumination angles when the 10A is lit and when the 10B is lit, and thus images which are read at the reading section 12 are different.

Except in the respects described above, the document verification apparatus 104 features structures similar to the document verification apparatus of the first exemplary embodiment of the present invention. In regard to operations, in step S106 of FIG. 7, step S124 of FIG. 8 and step S152 of FIG. 9, an image is read when the light source 10A is lit and an image is read when the light source 10B is lit, and a judgment of authenticity of a document P is performed in accordance with a combination of the two images. Otherwise, operations are similar to the document verification apparatus of the first exemplary embodiment of the present invention.

4. Fourth Exemplary Embodiment of the Present Invention

Figure 14A:
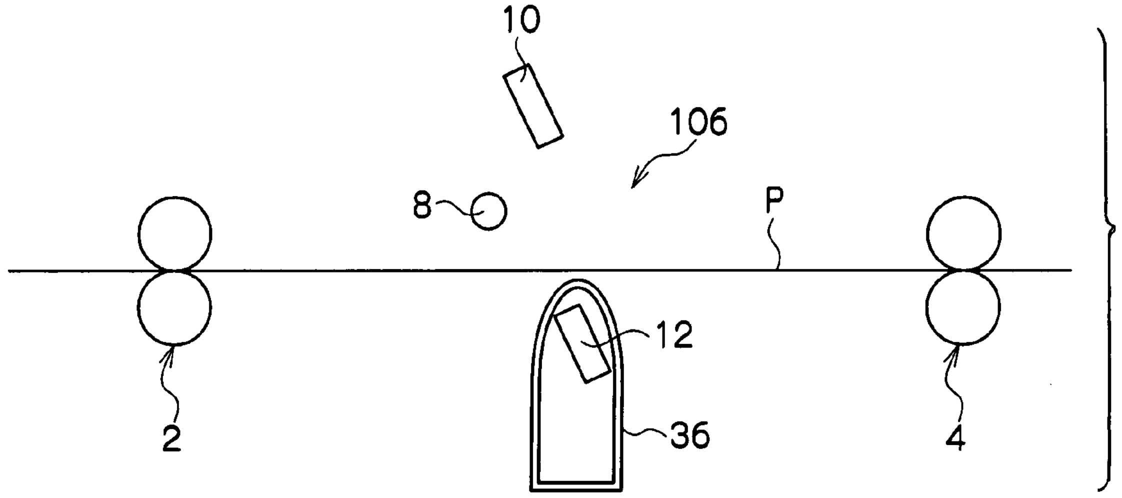
FIGS. 14A and 14B are schematic side views showing structure of a document verification apparatus of a fourth exemplary embodiment of the present invention.
Figure 14B:
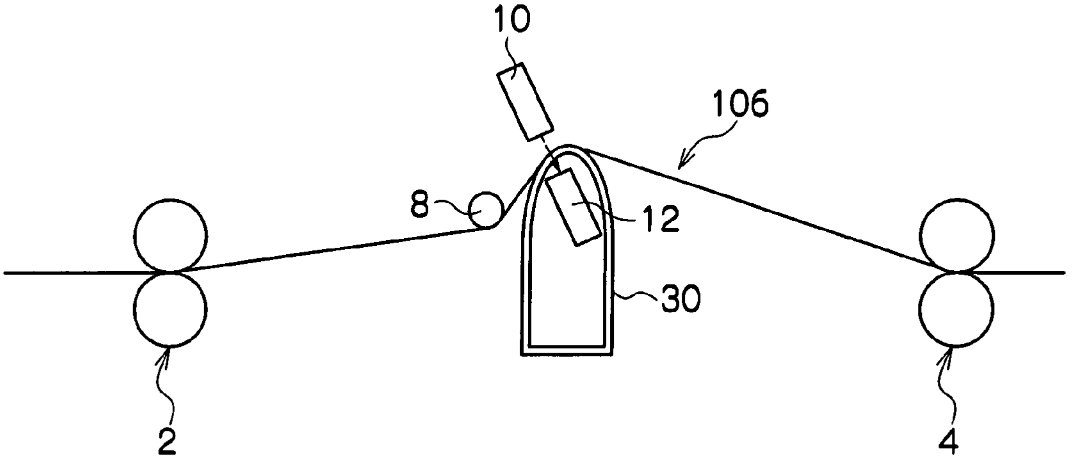

As shown in FIGS. 14A and 14B, a document verification apparatus 106 relating to a fourth exemplary embodiment of the present invention is provided with a flexing guide 36, which features structure similar to the flexing guide 16 of the document verification apparatus 102 of the second exemplary embodiment of the present invention. The flexing guide 36 as a whole is structured of a transparent material. The reading section 12 is enclosed inside the flexing guide 36.

Except in the respects described above, the document verification apparatus 106 features structures similar to the document verification apparatus 102 of the second exemplary embodiment of the present invention, including the flexing guide-raising and lowering mechanism.

In the document verification apparatus 106, when the flexing guide 36 is raised toward the document P as shown in FIG. 14B, the document P flexes in a concave form with respect to the reading section 12. In this state, when the light source 10 lights, the light from the light source 10 passes through the document P and a wall of the flexing guide 36 and is read by the reading section 12. Therefore, an image which is read by the reading section 12 is different from in the document verification apparatuses of the first to third exemplary embodiments of the present invention, being a transmission image obtained by light passing through the document P.

The document verification apparatus 106 features operations similar to a document verification apparatus of the first exemplary embodiment of the present invention, except in the respects described above.

5. Fifth Exemplary Embodiment of the Present Invention

—Structure—

Figure 15:
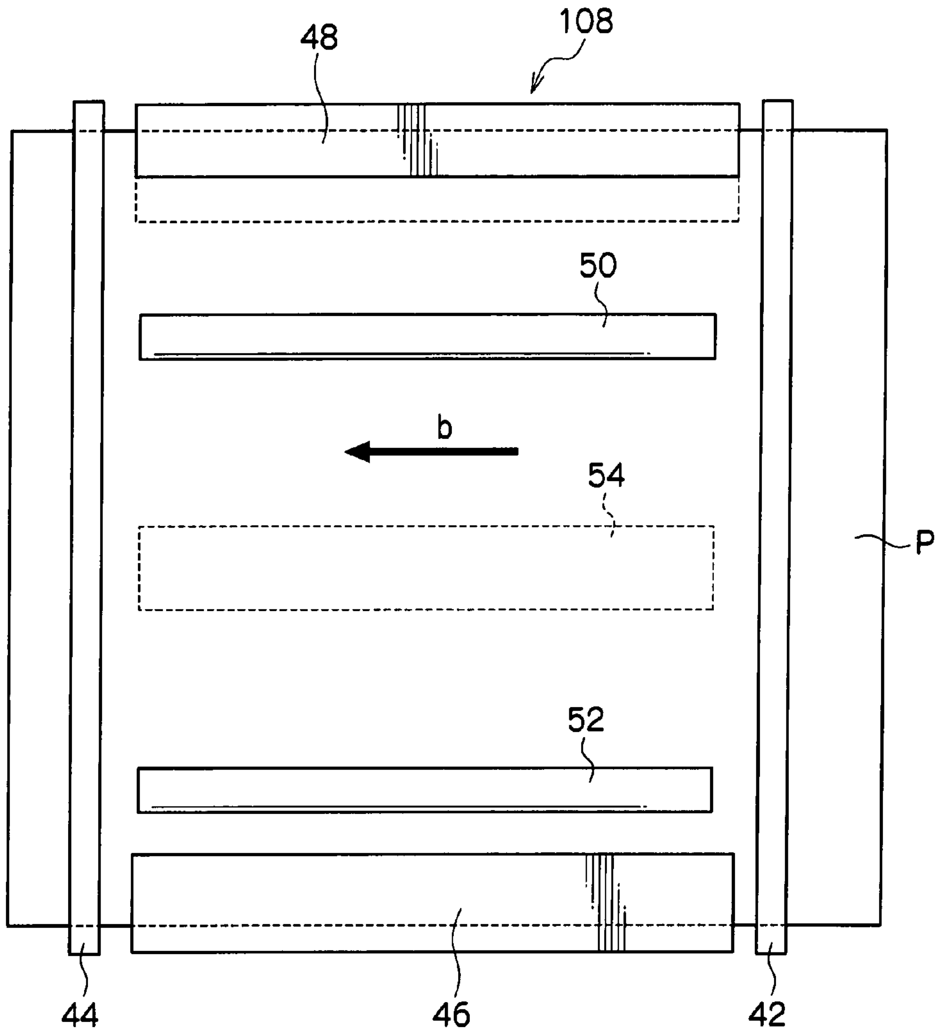
FIG. 15 is a schematic plan view showing structure of a document verification apparatus of a fifth exemplary embodiment of the present invention.
Figure 16A:
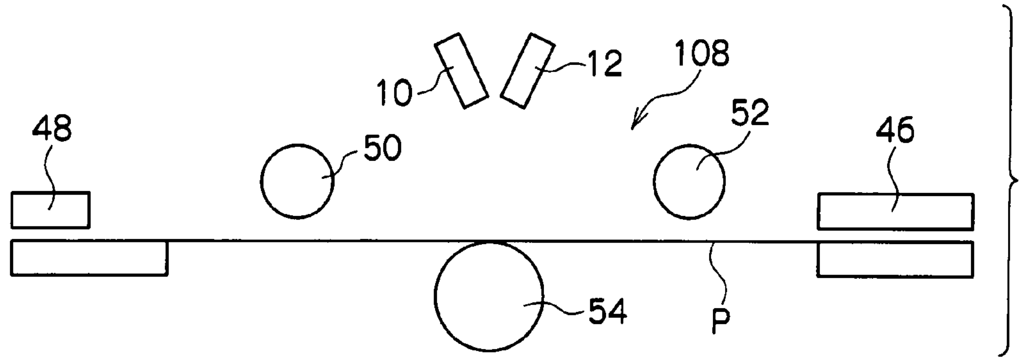
FIGS. 16A, 16B and 16C are side views showing structure and operation of the document verification apparatus of the fifth exemplary embodiment of the present invention.
Figure 16B:
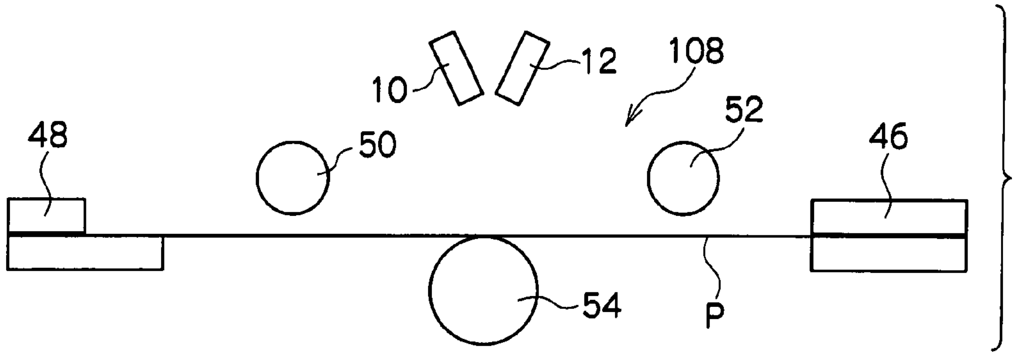
Figure 16C:
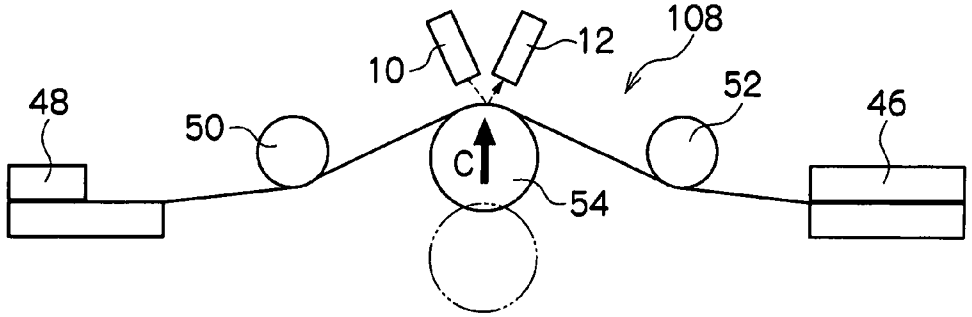

A document verification apparatus 108 relating to the fifth exemplary embodiment of the present invention is an example of a document verification apparatus which causes the document P to flex in a direction perpendicular to the conveyance direction of the document P. As shown in FIG. 15, the document verification apparatus 108 is provided with feed rollers 42 and 44, clamps 46 and 48, flexing auxiliary rollers 50 and 52, and a flexing roller 54. The feed rollers 42 and 44 nip the document P and convey the document P in a conveyance direction b. The clamps 46 and 48 clamp side edge portions of the document P along the conveyance direction b. The flexing auxiliary rollers 50 and 52 are arranged along the conveyance direction b at the upper side of the conveyance path of the document P. The flexing roller 54 is arranged along the conveyance direction b at an opposite side of the conveyance path from the flexing auxiliary rollers 50 and 52, to sandwich the conveyance path, such that the flexing roller 54 is disposed between the flexing auxiliary rollers 50 and 52. Further, as shown in FIGS. 16A to 16C, the light source 10 and the reading section 12 are provided at the upper side of the flexing roller 54. The document verification apparatus 108 is further provided with the judgment computer 20 which judges authenticity of the document P on the basis of reading results at the reading section 12. The light source 10, the reading section 12 and the judgment computer 20 feature structures and operations as described for the first exemplary embodiment of the present invention. Further, a flexing roller-raising/lowering mechanism which raises and lowers the flexing roller 54 features a structure similar to the flexing roller-raising/lowering mechanism 7 of the first exemplary embodiment of the present invention.

—Operation—

Next, operation of the document verification apparatus 108 will be described. As shown in FIGS. 15 and 16A, the document P is conveyed to a predetermined position by the feed rollers 42 and 44 and, as shown in FIG. 16B, the side edge portions along the conveyance direction b of the document P are clamped by the clamps 46 and 48. When the document P has been clamped by the clamps 46 and 48, as shown in FIG. 16C, the flexing roller 54 rises and the document P is flexed by the flexing auxiliary rollers 50 and 52 and the flexing roller 54 into a concave shape toward the reading section 12, along a direction intersecting the conveyance direction b. When the document P has been flexed, the light source 10 is lit and an image of the surface of the document P is read by the reading section 12. Here, a procedure for registering characteristic vector information of an original of a document P and a procedure for matching a document P with an original are as described for the first exemplary embodiment of the present invention.

6. Sixth Exemplary Embodiment of the Present Invention

—Structure—

An example of a document verification apparatus for verifying authenticity of booklet-type documents P, such as passports and the like, will be described below.

Figure 17:
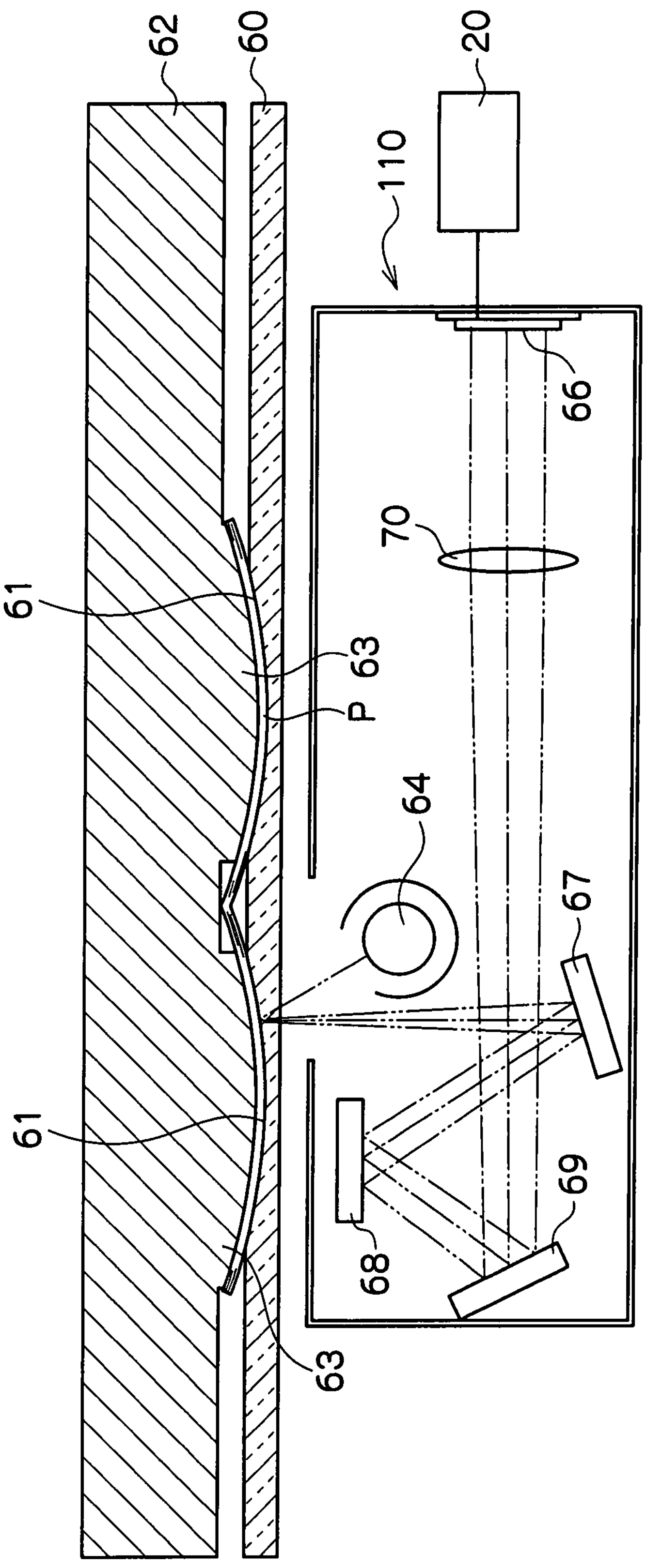
FIG. 17 is a schematic sectional view showing structure of a document verification apparatus of a sixth exemplary embodiment of the present invention.

As shown in FIG. 17, a document verification apparatus 110 relating to the sixth exemplary embodiment of the present invention is provided with a platen glass 60, a platen cover 62, a light source 64, an image capture element 66, reflection mirrors 67, 68 and 69, and a lens system 70. The document P is placed on the platen glass 60. The platen cover 62 is provided to be capable of opening and closing with respect to the platen glass 60, and presses the document P against the platen glass 60. The light source 64 illuminates light toward the document P that has been placed on the platen glass 60. The image capture element 66 captures an image obtained by light from the light source 64 reflecting from the document P. The reflection mirrors 67, 68 and 69 guide the light reflected from the document P to the image capture element 66. The lens system 70 focuses the image onto the image capture element 66. The image capture element 66 corresponds to a reading component of the present invention.

Concave surfaces 61 are formed at a portion of the platen glass 60 at which the document P is placed. Correspondingly, protruding surfaces 63 with shapes corresponding to the concave surfaces 61 are formed at positions of the platen cover 62 that correspond to the concave surfaces 61. The platen glass 60 and the platen cover 62 constitute a subject-flexing mechanism of the present invention.

—Operation—

Verification of a document P is performed by the document verification apparatus 110 with the following procedure.

First, the document P is placed on the concave surfaces 61 of the platen glass 60 and the platen cover 62 is closed. When the platen cover 62 is closed, the document is pressed against the concave surfaces 61 of the platen glass 60 by the protruding surfaces 63 of the platen cover 62. Thus, the document P is flexed into convex shapes toward the light source 64.

When the platen cover 62 has been closed, the light source 64 lights and an obtained image is read by the image capture element 66. Procedures of reading an original of a document P and of matching with the original are as described for the first exemplary embodiment of the present invention.

Hereabove, for the exemplary embodiments of the present invention, examples in which subject-reading apparatuses of the exemplary embodiments of the present invention are used for verification of documents have been described. However, subject-reading apparatuses of exemplary embodiments of the present invention may be employed for process management, online product inspection and the like in a papermaking plant, a film fabrication plant or the like, or for online product inspection at a planographic printing plate fabrication line. In such a case, the subject-reading apparatus may read a characteristic particular to subjects, and therefore the subjects need not necessarily feature random patterns as described above.

What is claimed is:

1. A surface-reading apparatus comprising:

a subject-flexing mechanism that causes a subject to flex in one of a convex form and a concave form;

a surface-reading component that reads a non-reproducible random pattern characteristic of a surface condition at a curved portion of the subject flexed by the subject-flexing mechanism; and an illumination component that illuminates light at the subject flexed by the subject-flexing mechanism such that the surface-reading component reads the characteristic of the surface condition of the subject by detecting one of reflected light and transmitted light due to the light from the illumination component, wherein different curvatures of the subject are made at a position at which the subject is read by moving the subject-flexing mechanism linearly.

2. A non-transitory computer readable storage medium storing a computer readable program executable by a computer for causing the computer to perform a function for verifying a subject, the function comprising the steps of:

(a) flexing the subject in one of a convex form and a concave form;

(b) reading a characteristic of a surface condition at a curved portion of the subject flexed in step (a);

(c) illuminating light at the subject such the characteristic of the surface condition of the subject is read by detecting one of reflected light and transmitted light due to the illuminated light; and (d) judging whether or not the subject is an original subject on the basis of surface information obtained by reading the characteristic of the surface condition of the subject in step (b) and surface information of the original subject, wherein different curvatures of the subject are made at a position at which the subject flexed in step (a) is read by moving the subject-flexing mechanism linearly.

3. A surface-reading apparatus comprising:

a subject-flexing mechanism that causes a subject to flex in one of a convex form and a concave form;

a surface-reading component that reads a non-reproducible random pattern characteristic of a surface condition at a curved portion of the subject flexed by the subject-flexing mechanism; and an illumination component that illuminates light at the subject flexed by the subject-flexing mechanism such that the surface-reading component reads the characteristic of the surface condition of the subject by detecting one of reflected light and transmitted light due to the light from the illumination component, wherein different curvatures of the subject are made at a position at which the subject is read by moving the subject-flexing mechanism, the subject-flexing mechanism includes:

a subject retention portion that retains a pair of mutually corresponding edge portions of the subject; and a subject-flexing member that presses a central portion of the subject retained by the subject retention portion in a thickness direction for causing the subject member to flex, and the subject-flexing mechanism flexes the subject with a first curvature by pressing with the subject-flexing member to a first position, and the subject-flexing mechanism flexes the subject with a second curvature by pressing with the subject-flexing member to a second position.

4. A surface-reading apparatus of comprising:

a subject-flexing mechanism that causes a subject to flex in one of a convex form and a concave form; and a surface-reading component that reads a characteristic of a surface condition of the subject flexed by the subject-flexing mechanism, wherein different curvatures of the subject are made at a position at which the subject is read by moving the subject-flexing mechanism, the subject-flexing mechanism includes:

a subject retention portion that retains a pair of mutually corresponding edge portions of the subject; and a subject-flexing member that presses a central portion of the subject retained by the subject retention portion in a thickness direction for causing the subject member to flex, and the subject-flexing mechanism flexes the subject with a first curvature by pressing with the subject-flexing member to a first position, the subject-flexing mechanism flexes the subject with a second curvature by pressing with the subject-flexing member to a second position, the characteristics of the surface condition are read with two curvatures respectively, and the apparatus further includes a determination component that determines whether or not the subject is genuine based on information obtained from the reading.

5. A surface-reading apparatus comprising:

a subject-flexing mechanism having a movable subject-flexing member that causes a subject to flex in one of a convex form and a concave form; and a surface-reading component that reads a non-reproducible random pattern characteristic of a surface condition of the subject flexed by the subject-flexing mechanism; and an illumination component that illuminates light at the subject flexed by the subject-flexing mechanism such that the surface-reading component reads the characteristic of the surface condition of the subject by detecting one of reflected light and transmitted light due to the light from the illumination component, wherein at a time that the subject is not moving, the movable subject-flexing member is moved linearly from a first position in which the subject is not flexed to a second position that causes the subject to flex in the one of a convex form and a concave form.

6. A non-transitory computer readable storage medium storing a computer readable program executable by a computer for causing the computer to perform a function for verifying a subject, the function comprising the steps of:

(a) at a time that the subject is not moving, flexing the subject in one of a convex form and a concave form by moving linearly a subject-flexing member;

(b) reading a characteristic of a surface condition at a curved portion of the subject flexed in step (a);

(c) illuminating light at the subject such the characteristic of the surface condition of the subject is read by detecting one of reflected light and transmitted light due to the illuminated light; and (d) judging whether or not the subject is an original subject on the basis of surface information obtained by reading the characteristic of the surface condition of the subject in step (b) and surface information of the original subject.

* * * * *